(12) United States Patent
Patel et al.

(10) Patent No.: US 11,343,186 B2
(45) Date of Patent: *May 24, 2022

(54) APPARATUS, SYSTEMS AND METHODS FOR PACKET BASED TRANSMISSION OF MULTIPLE DATA SIGNALS

(71) Applicant: Evertz Microsystems Ltd., Burlington (CA)

(72) Inventors: Rakesh Patel, Mississauga (CA); Romolo Magarelli, Kleinburg (CA)

(73) Assignee: Evertz Microsystems Ltd., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,016

(22) Filed: Nov. 25, 2019

(65) Prior Publication Data

US 2020/0169505 A1 May 28, 2020

Related U.S. Application Data

(63) Continuation of application No. 16/112,896, filed on Aug. 27, 2018, now Pat. No. 10,530,690, which is a
(Continued)

(51) Int. Cl.
*H04L 12/28* (2006.01)
*H04L 45/741* (2022.01)
(Continued)

(52) U.S. Cl.
CPC ............ *H04L 45/741* (2013.01); *H04L 12/56* (2013.01); *H04L 29/06027* (2013.01);
(Continued)

(58) Field of Classification Search
CPC .. H04L 45/741; H04L 12/56; H04L 29/06027
See application file for complete search history.

(56) References Cited

U.S. PATENT DOCUMENTS 5,162,904 A 11/1992 Beaulier et al.
5,889,775 A 3/1999 Sawicz et al.
(Continued)

FOREIGN PATENT DOCUMENTS

CA 2463228 A1 10/2004
EP 2725761 A1 4/2014
(Continued)

OTHER PUBLICATIONS

Evertz Microsystems Ltd. v. Lawo Inc. Lawo North America Corp., and Lawo AG. C.A. No. 19-302-MN-JLH, "Appendix A—Invalidity Claim Charts for the Asserted Claims for the Patents-in-Suit". Submitted with Defendants' Initial Invalidity Contentions, dated Jan. 23, 2020. 153 pages.
(Continued)

*Primary Examiner* — Bo Hui A Zhu
(74) *Attorney, Agent, or Firm* — Bereskin & Parr LLP/S.E.N.C.R.L, s.r.l.

(57) ABSTRACT

Apparatus, systems and methods for receiving one or more input signals and providing output signals in various video, audio, data and mixed formats are described. One or more input processors receive the input signals. Each of the input processors provides one or more packetized signals corresponding to one or more of the input signals received at the input processor. Each output processor can receive one or more packetized signals and generate one or more output signals. The output signals correspond to one or more of the input signals, additional locally generated signals or data relating to the signals or any combination of such signals. Use of a packet router according to the invention allows input signals encoded as one set of packetized signals to be recombined to provide additional packetized signals incorporating the same or different combinations of the packetized signals.

20 Claims, 11 Drawing Sheets

Related U.S. Application Data continuation of application No. 15/179,234, filed on Jun. 10, 2016, now Pat. No. 10,084,704, which is a continuation of application No. 14/753,424, filed on Jun. 29, 2015, now Pat. No. 9,473,322, which is a continuation of application No. 14/026,039, filed on Sep. 13, 2013, now Pat. No. 9,100,217, which is a continuation of application No. 10/816,841, filed on Apr. 5, 2004, now Pat. No. 8,537,838.

(60) Provisional application No. 60/459,964, filed on Apr. 4, 2003.

(51) Int. Cl.
| | | |
|---|---|---|
| *H04L 65/1101* | (2022.01) | |
| *H04N 7/52* | (2011.01) | |
| *H04N 21/226* | (2011.01) | |
| *H04N 21/234* | (2011.01) | |
| *H04N 21/236* | (2011.01) | |
| *H04L 65/60* | (2022.01) | |
| *H04L 12/54* | (2022.01) | |
| *H04L 61/5007* | (2022.01) | |
| *H04L 61/2514* | (2022.01) | |

(52) U.S. Cl.
CPC ...... *H04L 61/2007* (2013.01); *H04L 61/2514* (2013.01); *H04L 65/601* (2013.01); *H04L 65/607* (2013.01); *H04N 7/52* (2013.01); *H04N 21/226* (2013.01); *H04N 21/234* (2013.01); *H04N 21/236* (2013.01)

(56) References Cited

U.S. PATENT DOCUMENTS

| | | | |
|---|---|---|---|
| 5,982,456 | A | 11/1999 | Smith et al. |
| 6,292,229 | B1 | 9/2001 | Meyer |
| 6,404,811 | B1 | 6/2002 | Cvetko et al. |
| 6,430,183 | B1 | 8/2002 | Satran et al. |
| 6,519,223 | B1 | 2/2003 | Wager et al. |
| 6,601,210 | B1 | 7/2003 | Kagan |
| 6,937,291 | B1 | 8/2005 | Gryskiewicz |
| 6,950,097 | B1 | 9/2005 | Hojabri |
| 7,012,895 | B1 | 3/2006 | Mir |
| 7,039,048 | B1 | 5/2006 | Monta et al. |
| 7,058,009 | B1 | 6/2006 | Skirmont et al. |
| 7,190,695 | B2 | 3/2007 | Schaub et al. |
| 7,269,841 | B1 | 9/2007 | Hendricks et al. |
| 7,657,916 | B2 | 2/2010 | Rodriguez et al. |
| 7,756,118 | B2 | 7/2010 | Harmon et al. |
| 7,873,056 | B2 | 1/2011 | Higuchi et al. |
| 7,920,151 | B2 | 4/2011 | Macinnis et al. |
| 8,194,561 | B2 | 6/2012 | Kogata et al. |
| 8,233,477 | B1 | 7/2012 | Goergen et al. |
| 8,537,838 | B2 | 9/2013 | Patel et al. |
| 8,631,172 | B2 | 1/2014 | Greenhalgh |
| 8,798,045 | B1 | 8/2014 | Aybay et al. |
| 8,929,362 | B1 | 1/2015 | Cohn et al. |
| 8,942,085 | B1 | 1/2015 | Pani et al. |
| 9,100,217 | B2 | 8/2015 | Patel et al. |
| 9,258,253 | B2 | 2/2016 | Subramanian et al. |
| 9,473,322 | B2 | 10/2016 | Patel et al. |
| 9,479,711 | B2 | 10/2016 | Liron |
| 9,510,092 | B2 | 11/2016 | Butters |
| 10,084,704 | B2 | 9/2018 | Patel et al. |
| 10,530,690 | B2 | 1/2020 | Patel et al. |
| 2001/0034788 | A1* | 10/2001 | McTernan ......... H04L 29/06027 709/232 |
| 2002/0008780 | A1 | 1/2002 | Han |
| 2002/0031125 | A1 | 3/2002 | Sato |
| 2002/0056125 | A1 | 5/2002 | Hodge et al. |
| 2002/0059623 | A1 | 5/2002 | Rodriguez et al. |
| 2003/0063611 | A1 | 4/2003 | Schaub et al. |
| 2003/0079019 | A1 | 4/2003 | Lolayekar et al. |
| 2003/0101426 | A1 | 5/2003 | Sarkinen et al. |
| 2003/0156535 | A1 | 8/2003 | Lebizay et al. |
| 2003/0198226 | A1 | 10/2003 | Westberg |
| 2003/0227926 | A1 | 12/2003 | Ramamurthy et al. |
| 2004/0003044 | A1* | 1/2004 | Teoh ............... H04L 65/4046 709/205 |
| 2004/0187112 | A1 | 9/2004 | Potter, Jr. |
| 2005/0076134 | A1 | 4/2005 | Bialik et al. |
| 2012/0020373 | A1 | 1/2012 | Subramanian et al. |
| 2014/0269331 | A1 | 9/2014 | Pfeifer et al. |
| 2014/0269716 | A1 | 9/2014 | Pruss et al. |
| 2014/0269762 | A1 | 9/2014 | Voit et al. |
| 2014/0280488 | A1 | 9/2014 | Voit et al. |
| 2014/0280802 | A1 | 9/2014 | McDowall |
| 2014/0280834 | A1 | 9/2014 | Medved et al. |
| 2014/0280835 | A1 | 9/2014 | Pruss et al. |
| 2014/0280838 | A1 | 9/2014 | Finn et al. |
| 2014/0280893 | A1 | 9/2014 | Pfeifer et al. |
| 2014/0280898 | A1 | 9/2014 | Voit et al. |
| 2014/0280900 | A1 | 9/2014 | McDowall |
| 2014/0282628 | A1 | 9/2014 | Pruss et al. |
| 2014/0317256 | A1 | 10/2014 | Jiang et al. |
| 2014/0365622 | A1 | 12/2014 | Iyengar et al. |
| 2014/0365634 | A1 | 12/2014 | Metz et al. |
| 2015/0003283 | A1 | 1/2015 | Previdi et al. |
| 2015/0029849 | A1 | 1/2015 | Frost et al. |
| 2015/0049631 | A1 | 2/2015 | Heron et al. |
| 2015/0071111 | A1 | 3/2015 | Tao et al. |
| 2015/0081884 | A1 | 3/2015 | Maguire et al. |
| 2015/0112933 | A1 | 4/2015 | Satapathy |
| 2015/0163158 | A1 | 6/2015 | Ryland |
| 2015/0195162 | A1 | 7/2015 | Gandham et al. |
| 2015/0200955 | A1 | 7/2015 | Martin |
| 2015/0215819 | A1 | 7/2015 | Bosch et al. |
| 2015/0229709 | A1 | 8/2015 | Pruss et al. |

FOREIGN PATENT DOCUMENTS

| | | | |
|---|---|---|---|
| FR | 2655451 | A1 | 6/1991 |
| FR | 2726723 | A1 | 5/1996 |
| FR | 2793042 | A1 | 11/2000 |
| FR | 2793043 | A1 | 11/2000 |
| WO | 1999017547 | A1 | 4/1999 |
| WO | 2000016560 | A1 | 3/2000 |
| WO | 2003036501 | A1 | 5/2003 |
| WO | 2014150113 | A1 | 9/2014 |
| WO | 2014153233 | A1 | 9/2014 |
| WO | 2014153237 | A1 | 9/2014 |
| WO | 2014176105 | A1 | 10/2014 |
| WO | 2014198053 | A1 | 12/2014 |

OTHER PUBLICATIONS

*Evertz Microsystems Ltd.* v. *Lawo Inc. Lawo North America Corp., and Lawo AG.* C.A. No. 19-302-MN-JLH, "Defendants' Initial Invalidity Contentions", dated Jan. 23, 2020. 101 pages.

Schulzrinne, et al. RFC No. 1889, published in Jan. 1996 and titled "RTP: A Transport Protocol for Real-Time Applications", pp. 1-75.

*Evertz Microsystems Ltd.* v. *Lawo Inc. Lawo North America Corp., and Lawo AG.* C.A. No. 19-302-MN "Complaint for Patent Infringement" including "Exhibit A" and "Exhibit B", dated Feb. 1, 2019. Filed in the United States District Court for the District of Delaware. pp. 1-54.

*Evertz Microsystems Ltd.* v. *Lawo Inc. Lawo North America Corp., and Lawo AG.* C.A. No. 19-302-MN, "Plaintiff's Corporate Disclosure Statement" dated Feb. 1, 2019. Filed in the United States District Court for the District of Delaware. 1 page.

*Evertz Microsystems Ltd.* v. *Lawo Inc. Lawo North America Corp., and Lawo AG,* C.A. No. 19-302-MN , "Civil Cover Sheet" dated Feb. 1, 2019. Filed in the United States District Court for the District of Delaware. 1 page.

*Evertz Microsystems Ltd.* v. *Lawo Inc. Lawo North America Corp., and Lawo AG.* C.A. No. 19-302-MN ,"First Amended Complaint for Patent Infringement" dated Mar. 11, 2019. Filed in the United States District Court for the District of Delaware. pp. 1-191.

(56) References Cited

OTHER PUBLICATIONS

Computer Graphics (SIGGRAPH '83 Proceedings) vol. 17, No. 3, published in Jul. 1983 and titled "Pyramidal Parametrics"; pp. 1-11.
RFC No. 1889, published in Jan. 1996 and titled "RTP: A Transport Protocol for Real-Time Applications", pp. 1-75.
ACM Multimedia protocol, published in Oct. 2001 and titled "Scalable Streaming of JPEG2000 Images using Hypertext Transfer", 9 pages.
Proc. Int. Conf. on Image Processing, vol. 1, published in Sep. 2002 and titled "Remote Browsing of JPEG 2000 Images", pp. I-229 to I-232 (4 pages).
RFC No. 3190, published in Jan. 2002 and titled "RTP Payload Format for 12-bit DAT Audio and 20- and 24-bit Linear Sampled Audio", pp. 1-17.
Visual Communications and Image Processing presentation, presented in 2003 and titled "Architecture, Philosophy and Performance of JPIP: Internet Protocol", 15 pages.
RFC No. 3497, published in Mar. 2003 and titled "RTP Payload Format for Society of Motion Picture and Television Engineers (SMPTE) 292M Video", pp. 1-12.
RFC No. 3551, published in Jul. 2003 and titled "RTP Profile for Audio and Video Conferences with Minimal Control", pp. 1-38.
RFC No. 3550, published in Jul. 2003 and titled "RTP: A Transport Protocol for Real-Time Applications", pp. 1-89.
RFC No. 4175, published in Sep. 2005 and titled "RTP Payload Format for Uncompressed Video", pp. 1-14.
RFC No. 4855, published in Feb. 2007 and titled "Media Type Registration of RTP Payload Formats", pp. 1-11.
VSF vol. 7, No. 1, published in Feb. 2007 and discussing work on the SMPTE ST 2022 standard on video over IP. 6 pages.
SMPTE ST 2022-2:2007, published in May 2007 and titled "Unidirectional Transport of Constant Bit Rate MPEG-2 Transport Streams on IP Networks", 9 pages.
VSF vol. 9, No. 1, published in Apr. 2008 and discussing work on SMPTE ST 2022-6 standard on high bit rate audio video over IP "HBRAV-IP" transport, 5 pages.
VSF vol. 13, No. 1, published in Jun. 2010 and discussing work on SMPTE ST 2022-6 on high bit rate media transport "HBRMT" encapsulation, 6 pages.
SMPTE ST 2022-6:2012, published in Oct. 2012 and titled "Transport of High Bit Rate Media Signals over IP Networks—HBRMT", 16 pages.
EBU (European Broadcasting Union) Whitepaper, published in Nov. 2012 and titled "SDI over IP—seamless signal switching in SMPTE 2022-6 and a novel multicast routing concept", pp. 1-7.
EBU Whitepaper, published in Apr. 2014 and titled "Ultra High Definition TV Over IP Networks", 11 pages.
VSF TR-03, published in Nov. 2015 and titled "Transport of Uncompressed Elementary Stream Media over IP", 22 pages.
Bits by the Bay SMPTE Technology Conference presentation, published and presented in May 2016 and titled "Video Transport and Synchronization", pp. 1-99.
RFC No. 8331, published in Feb. 2018 and titled "RTP Payload for Society of Motion Picture and Television Engineers (SMPTE) ST 291-1 Ancillary Data", pp. 1-22.
Defendants Lawo Inc., Lawo Corp., and Lawo AG's Answer to Complaint, Affirmative Defenses, and Counterclaims. Case 1:19-cv-00302-MN Document 18 Filed Jul. 10, 2019, pp. 1-68.
*Evertz Microsystems Ltd.* v. *Lawo Inc. Lawo North America Corp., and Lawo AG.* C.A. No. 19-302-MN, "Defendants Lawo Inc., Lawo Corp., and Lawo AG's Amended Answer to Amended Complaint, Affirmative Defenses, and Counterclaims" filed Aug. 7, 2019. 101 pages.

*Evertz Microsystems Ltd.* v. *Lawo Inc. Lawo North America Corp., and Lawo AG.* C.A. No. 19-302-MN, "Plaintiff's Motion to: (1) Dismiss Defendants' Counterclaims Relating to Antitrust, Fraud, Defamation, and Unfair Competition; (2) Strike Certain of Defendants' Affirmative Defenses; and (3) In the Alternative, Sever and Stay Defendants' Antitrust, Fraud, Defamation, and Unfair Competition Counterclaims," dated Aug. 28, 2019. 2 pages.
*Evertz Microsystems Ltd.* v. *Lawo Inc. Lawo North America Corp., and Lawo AG.* C.A. No. 19-302-MN, "Plaintiff's Opening Brief in Support of Its Motion to: (1) Dismiss Defendants' Counterclaims Relating to Antitrust, Fraud, Defamation, and Unfair Competition; (2) Strike Certain of Defendants' Affirmative Defenses; and (3) In the Alternative, Sever and Stay Defendants' Antitrust, Fraud, Defamation, and Unfair Competition Counterclaims," dated Aug. 29, 2019. 145 pages.
VSF TR-05, published in Jun. 2018 and titled Essential Formats and Descriptions for Interoperatbility of SMPTE ST 2110-20 Video Signals. Jun. 23, 2018. 19 pages.
Axis, "200 User's Manual", Rev. 1.6, Part No. 14978, Oct. 1998, 107 pages.
Grass Valley, "Trinix Digital Video Router Planning and Installation Manual", Software Version 2.4.1, issued Aug. 4, 2007 , 232 page.
Miranda (Grass Valley), "NV920 Control System QuickStart Guide", published Apr. 29, 2013, 11 pages.
Grass Valley, "TRINIX Broadlinx Software Release Notes", Software Version 3.2.0, published Mar. 2011, 32 pages.
Grass Valley, "Encore Control System Installation and Service Manual", Software Version 1.8.1, published Mar. 2011, 124 pages.
Grass Valley Group, "Encore Control System Software Release Notes Addendum", Software release 1.5.2, published Jun. 2002, revised Nov. 2002, 6 pages.
Leitch Inc., "Integrator Series High Definition Switcher Matrix Module Set Instruction Manual", published Feb. 1999, 30 pages.
Leitch Inc., "Integrator Large Routing Systems Brochure", published Apr. 2001, 8 pages.
Mellanox Technologies, "Introduction to InfiniBand"—White Paper, published 2003, 20 pages.
Cisco Press, Dave Hucaby, Steve McQuerry, "Field Manual: Catalyst Switch Configuration", published Sep. 6, 2002, 560 pages.
Cisco Systems, "Catalyst 6000 and 6500 Series Architecture"—Whitepaper, published Jul. 2001, 20 pages.
Cisco Systems, "Cisco Products Quick Reference Guide", published Apr. 2003, 238 pages.
Grass Valley, "Kalypso Installation Planning Guide", published Jun. 2004, 88 pages.
Grass Valley, "Kayenne Comparison Guide", published 2011, 2 pages.
Grass Valley, "Kayenne Installation & Service Manual"—Version 14.3, published Apr. 4, 2019, 399 pages.
Grass Valley, "Kalypso Video Production Center Data Sheet", published 2003, 4 pages.
Grass Valley, "Encore Control System—Installation and Service Manual"—Software Version 1.7.4.1, published Oct. 2009, pp. 1-198.
Grass Valley, "Encore Control System—Installation and Service Manual"—Software Version 1.7.4.1, published Oct. 2009, pp. 199-354.
*Evertz Microsystems Ltd.* v. *Lawo Inc. Lawo North America Corp., and Lawo AG.* C.A. No. 19-302-MN-JLH, "Appendix A", Submitted with "Defendants' Initial Invalidity Contentions", dated Feb. 11, 2021, 187 pages.
*Evertz Microsystems Ltd.* v. *Lawo Inc. Lawo North America Corp., and Lawo AG.* C.A. No. 19-302-MN-JLH, "Defendants' Final Initial Invalidity Contentions", dated Feb. 11, 2021, 97 pages.

* cited by examiner

APPARATUS, SYSTEMS AND METHODS FOR PACKET BASED TRANSMISSION OF MULTIPLE DATA SIGNALS

CROSS-REFERENCE TO RELATED APPLICATIONS

This application is a continuation of U.S. patent application Ser. No. 16/112,896 filed Aug. 27, 2018, which is a continuation of U.S. patent application Ser. No. 15/179,234 filed Jun. 10, 2016 (U.S. Pat. No. 10,084,704), which is a continuation of U.S. patent application Ser. No. 14/753,424 field Jun. 29, 2015 (U.S. Pat. No. 9,473,322), which is a continuation of U.S. patent application Ser. No. 14/026,039, filed Sep. 13, 2013 (U.S. Pat. No. 9,100,217), which is a continuation of U.S. patent application Ser. No. 10/816,841 filed Apr. 5, 2004 (U.S. Pat. No. 8,537,838), which claims the benefit of U.S. Provisional Patent Application No. 60/459,964, filed Apr. 4, 2003. The entire contents of U.S. patent application Ser. No. 16/112,896, U.S. patent application Ser. No. 15/179,234, U.S. patent application Ser. No. 14/753,424, U.S. patent application Ser. No. 14/026,039, U.S. patent application Ser. No. 10/816,841 and U.S. Provisional Patent Application No. 60/459,964 are hereby incorporated by reference.

FIELD OF THE INVENTION

This invention relates to systems for transmitting and distributing audio data, video data and other types of data.

BACKGROUND OF THE INVENTION

Recent advances in video monitor technology have resulted in the development of large format, high quality video displays that are capable of displaying multiple video signals simultaneously. In television studios and other locations where many different video sources must be monitored, these video displays have begun to displace traditional individual monitors that displayed a single video source to which they were physically coupled.

Modern signal processing equipment allows video and other data to be routed to different display monitors, however, this equipment can still require that for a particular signal to be used in multiple locations on multiple display devices it must be replicated and coupled to equipment in the different locations. This results in excessive cabling requirements, multiple signal regeneration and replication stages, and can result in degraded signals and multiple failure points within the signal path.

There is a need for an improved efficient system for receiving various input signals, including video, audio and data signals, formatting the received signals and routing the formatted signals to various output devices.

SUMMARY OF THE INVENTION

In one embodiment, the present invention provides a system that includes a master controller, one or more input processors, one or more output processors, and one or more user controllers. The system may also include additional master controllers that serve as back-up master controllers.

One or more input devices are coupled, directly or indirectly, to each of the input processors. Each input device provides one or more input signals to the input processors. One or more output devices are coupled to the output processors. Each output processor receives an output signal from an output device. Each of the input processors generates one or more packetized signals. Each packetized signal is transported across a communications link to one or more of the output processors. Each output processor may receive one or more packetized signals.

The master controller receives user control signals from one or more user controllers indicating which input signals are to be routed to which output devices. The user control signals may also indicate the format in which the input signal is to be presented at the output device.

For example, for a video input signal the user control signals may specify the position and dimensions of a window on an output display device in which the input video signal is to be displayed. The user control signals may also define other characteristics for the displayed video signal, such as color balance, white balance, color to black & white conversion or the addition of a border or any other characteristics that a video signal may be processed to have.

For an audio input, the user control signals may specify a particular equalization (ie. jazz, rock, classical), volume balancing to some specified maximum or average volume, left-right signal balance, encoding in or conversion to a particular noise reduction and/or a multi-channel audio standard. For a data signal, the user controls may specify characteristics that are appropriate to the data.

In response to the user control signals, the master controller generates input processor control signals to operate the input processors and output processor control signals to operate the output processors. The input and output processor control signals may be transmitted to the various input and output processors using any type of communications link. The master controller coordinates the operations of the various input and output processors (and other elements of the system) to provide the output signals requested by a user or users who operate the user controllers to generate the user control signals.

If the system includes more than one master controller, one of the master controllers may be designated as a primary master controller and the remaining master controllers designated as backup master controllers. Each of the master controllers is coupled to the user controllers to receive the user control signals and is capable of generating the input processor control signals and the output processor control signals. The primary master controller actively generates the input processor control signals and output processor control signals. If the master controller fails or is disabled for any reason, one of the backup master controllers may be designated as the primary master controller.

Each input processor has an input processor local controller which receives the input processor control signals for that input processor. In response to the input processor control signals, the input processor local controller configures the various components of the input processor to receive and process the input signals coupled to that input processor and to generate one or more packetized signals, as requested by the master controller.

Each input processor includes a plurality of data buffers to store each input signal in a digital form. If an input signal is received in an analog form, an analog-to-digital converter is dynamically coupled between an input port at which the input signal is received and a data buffer to digitize the signal. Some input signals may be received in a processed manner, meaning that the signal has been processed in some manner. If an input signal is received in a processed manner then an un-processor may be dynamically coupled between an input port at which the input signal is received and a data buffer in which the input signal is stored. Additionally each input processor may include one or more data analyzers that can be dynamically coupled to each input signal to provide information about the input signal. The resulting information is also stored in a data buffer. The buffered signals are then read out and processed by signal processors to format them as indicated by the user control signals. The processed signals are also buffered in data buffers. Each input signal may be processed multiple times to create different versions of the input signal, to extract various information regarding the input signal for use on different output devices, or for use on the same output device in different versions, formats or sizes.

The data buffers in the input processor, the output processor and other components and embodiments of the invention are used to temporarily store data that is received from a source and is subsequently read out by one or more recipient or destination elements or devices. Data may be read out in the order in which it is received, in which case a first-in/first-out buffer may be used to store the data. Alternatively, the data may be read out in any order by the recipient elements. In each case, the data buffer is configured to retain any datum until it has been read by all recipient elements that use the datum.

Each of the buffered signals (including the input signals and the processed signals) is assigned a global identification code. One or more of the buffered signals are converted into a packetized signal by a packetized signal output stage in each input processor. Each packetized signal contains a series of packets. Each packet contains a part of the data from the buffered signal along with the global identification code of the buffered signal. An input processor may have more than one packetized signal output stages to produce more than one packetized signal.

A packetized signal may be converted into and transmitted as a bitstream, or it may be transmitted using any communications protocol.

Each output processor receives one or more packetized signals. Each packetized signal is buffered as it is received. As complete packets corresponding to each global identification code are received, they are assigned a local identification code and are buffered in a separate data buffer. The isolated packets in data buffer correspond to a particular version of an input signal received at one of the input processors. The isolated stream may be processed to reverse any signal processing step or steps applied in the input processor or in an input device or combination of devices that combine to produce an input signal coupled to the input processor, such as a data compression step, or to apply additional signal processing steps. Any such processed signal is buffered again and assigned a new local identification code. One or more these buffered signals is then combined to form each output signal.

In one embodiment of the invention, a packet router is coupled between a plurality of input processors and a plurality of output processors. The packet router receives packetized signals from the input processors and isolates the packets corresponding to each global identification code. The packetized router then assembles new packetized signals corresponding to a combination of the global identification codes. The packetized router operates under the control of the master controller to route packets with the appropriate global identification code to the appropriate output processor. The packet router allows an input signal received at any of the input processors to be formatted and routed to any of the output processors.

In another embodiment of a packet router according to the invention, packets from one or more incoming packetized signals are stored in packet storage locations within a memory system. The packets are then read by one or more packetized signal output stages, each of which produces an outgoing packetized signal corresponding to a selected set of global identification codes. Storage of incoming packets and distribution of the packets to the packetized signal output stages is controlled by a router controller. In another embodiment of a packet router, one or more signal processors, such as video scalers or delay elements, are provided to process the incoming packets to provide processed packets that form a processed signal. Each processed signal is assigned a unique global identification code and may be included in an outgoing packetized signal.

These and other aspects of the invention and its various embodiments are described in greater details below,

BRIEF DESCRIPTION OF THE DRAWINGS

Several exemplary embodiments of the present invention will now be described in detail with reference to the drawings, in which.

DETAILED DESCRIPTION OF EXEMPLARY EMBODIMENTS

Figure 1:
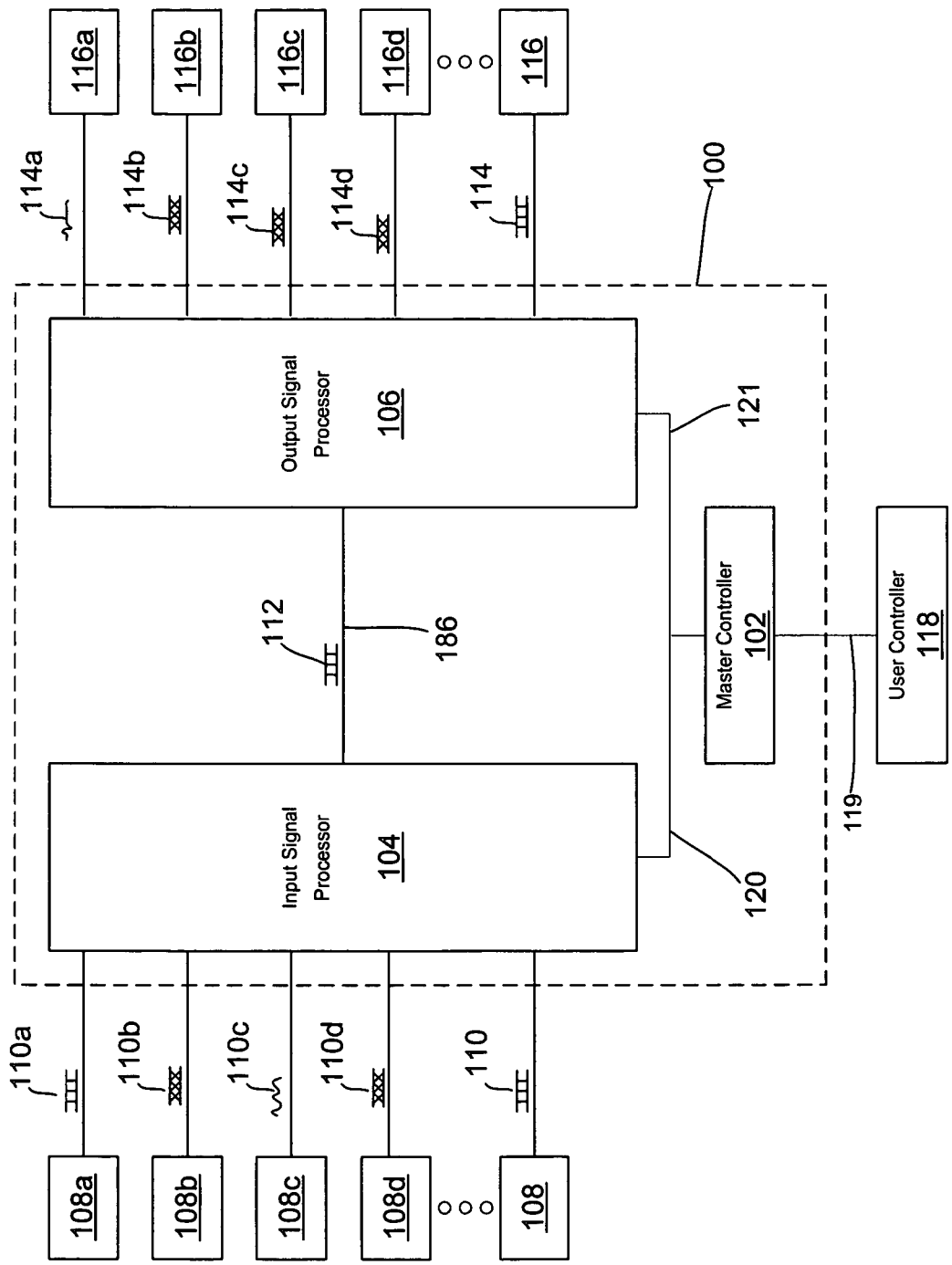
FIG. 1 illustrates a system according to the present invention.

Reference is first made to FIG. 1, which illustrates a signal processing system 100. The signal processing system includes a master controller 102, an input processor 104 and an output processor 106 according to the present invention. The input processor 104 receives a plurality of input signals 110 from various signal sources 108 and provides a packetized signal 112. The packetized signal 112 corresponds to some or all of the input signals 110 or to data or processed signals derived from the input signals. The packetized signal 112 is transported by a communications link 186 to the output processor 106. The output processor 106 receives the packetized signal 112 and produces one or more output signals 114, which are processed by output devices 116. The output signals 114 correspond, at least in part, to one or more of the input signals 110.

The system may additionally include backup master controllers (not shown).

The input processor 104 and output processor 106 operate under the control of the master controller 102. The master controller 102 is coupled to one or more user controllers 118, from which the master controller receives user control signals 119. The master controller 102 and the user controllers 118 may be combined in a single unit, or may be assembled in a single assembly, or they may be separate units that are coupled together.

A user or multiple users (not shown) human or some other type of device (for example automated monitoring and control systems) operate the user controllers 118 to generate the user control signals 119. The user control signals 119 indicate which input signals or signals derived from the input signals 110 the user would like included in the output signal 114 provided to each output device. Each user may have control over one or more output devices 116 in whole or in part. The user control signals 119 may also indicate additional characteristics about the output signal 114 provided to each output device 116. The master controller 102 translates the users control signals 119 into input processor control signals 120 and output processor control signals 121 to control the operation of the input processor 104 and the output processor 106 respectively so that the output signals 114 are provided in accordance with the user control signals 119.

The input signals 110 may be base-band, compressed, time division multiplexed audio signals, video signals (which may also include audio information), metadata, or other data signals. Similarly, the output signals 114 may be audio signals, video signals, or data signals. Typically, each output signal 114 will correspond to one or more of the input signals and or information derived from the input signal. A particular output signal may include a combination of audio, video or data input signals or signals produced by input signal analyzers or any combination of these types of signals. The nature of each output signal 114 is appropriate for the output device 116 that receives the output signal 114. Some of the output devices 116 may be video monitors, such as analog video monitor 116a and digital video monitor 116b, for displaying output video signals. Some of the output devices 116 may be sound systems, such as sound amplification and broadcast system 116c, for further processing or playing output audio signals. Some of the output devices may be data processing systems, such as computer system 116d, for further processing or displaying the output data signals. In any particular embodiment of the present invention, the output signals 114 may be of the same or different types, depending on the usage of the embodiment. In an alternative embodiment of the invention, the output processor may provide only a single output signal. The type of any particular signal may change depending on the usage of the signal, under the control of the master controller 102.

Figure 2:
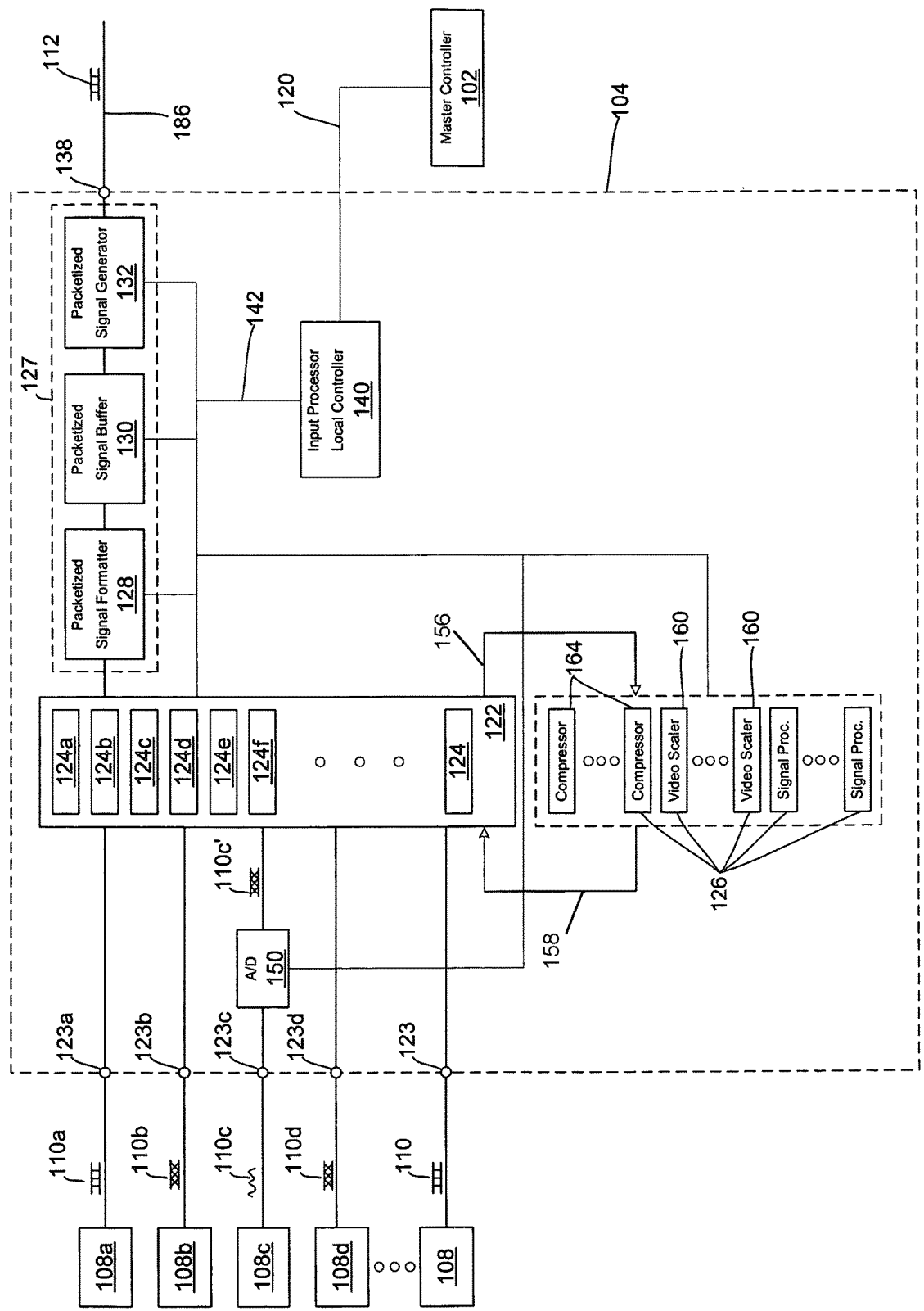
FIG. 2 illustrates a first input processor according to the present invention.

Reference is next made to FIG. 2, which illustrates the input processor 104 in greater detail. Input processor 104 includes a plurality of input ports 123, a plurality of input signal analyzers or processors, such as A/D converter 150, a plurality of data buffers 124, which are part of a memory system 122, one or more signal processors 126, a packetized signal output stage 127, a packetized signal output port 138 and an input processor local controller 140. The packetized signal output stage 127 includes a packetized signal formatter 128, a packetized signal buffer 130 and a packetized signal generator 132.

Memory system 122 may be a local memory device or memory space within the input processor 104 or it may be located on an attached storage device or other medium. Data buffers 124 will typically comprise memory space allocated within memory system 122.

The input processor local controller 140 receives the input processor control signals 120. The input processor local controller 140 controls the operation of the various elements of the input processor 104 through control lines 142 in response to the input processor control signals 120.

Each input signal 110 is coupled to one of the input ports 123. Each of the input ports 123 is coupled to the memory system 122. Each input signal 110 is buffered in a data buffer 124 in memory system 122. Analog input signals 110 are converted to a digital version and the digital version is buffered in a data buffer 124. For example, if input signal 110c is an analog input signal, then an analog-to-digital (A/D) converter 150 is dynamically coupled between input port 110c and memory system 122 to convert input signal 110c into a corresponding signal 110c' comprising a stream of packets according to a digital signal standard. For example, if input signal 110c is a standard 1V peak-to-peak audio signal, it may be sampled and converted by A/D converter 150 into a WAV digital audio signal 110c', as is commonly done to record music on CD-ROM media. For example, if input signal 110c is a compressed video stream a decompressor (one of the signal processors) may be dynamically coupled between input port 110c and memory system 122 to convert input signal 110c into a corresponding signal 110c' comprising a stream of data according to a digital signal standard.

In the present embodiment, the input processor contains a bank of A/D converters, each of which may dynamically be coupled between any of the input ports 123 (or a group of the input ports) and memory system 122. The input processor local controller 140 controls the coupling of any particular A/D converter between any particular input port 123 and memory space 122. A particular A/D converter 150 may be shared by two or more input ports 123 under the control of input processor local controller 140. Alternatively, a dedicated A/D converter 150 may be provided for some or all of the input ports 123. The A/D converter 150 may be activated by the input process local controller 140 if the input signal 110 received at a port 123 is an analog signal. In another alternative embodiment, some or all of the input ports 123 may be designated as analog input ports and an A/D converter may be permanently coupled between those ports and the memory system 122.

The input ports may be any type of communication port, such as an Ethernet, BNC, optical, telephone line or any port suitable with any type of communication system. The input signals may be in any communication standard or protocol, including, including TCP/IP. In this case, the coupling between the input device and the processor may be a LAN, WAN, the Internet or another TCP/IP communication system.

The input processor 104 may also contain a bank of input signal analyzers (not shown). The input signal analyzers may be dynamically or statically coupled to an input port in the same manner as A/D converter 150. For example if the input signal is a video signal, an input signal analyzer may extract performance and signal content metrics from or about the input signal such as blackness of the signal, the amount of motion within the signal, bit or formatting errors in the signal. The metadata produced by the data analyzer is stored in a data buffer and is considered and treated as a processed signal that can be packetized and coupled to the output processor over a communication link.

Each of the input signals 110 may be retrieved from the corresponding data buffer 124 as a buffered signal 156.

The input processor may also include other input signal processing elements that may be coupled between an input port 123 and memory system 122. The signal processing elements may include video scalers, video de-interlacers, data compressors, data de-compressors, data format converters or any other type of signal processor, including the signal processing elements described below. For example, if one of the input signals is an analog NTSC video signal, then a video signal digitizer may be dynamically coupled between an input port at which the signal is received to convert the input signal into a MPEG2 digital video signal. The input processor may contain a bank of input signal processing elements and analyzers, which may be dynamically coupled between any input port and memory system 122. Input processing elements or analyzers may also (or alternatively) be coupled to only one port for selective use with that port. Input processing elements may also (or alternatively) be permanently coupled to one or more of the input ports.

The signal processors 126 are coupled to memory system 122 to retrieve the buffered signals 156 from memory system 122, process the buffered data signals to generated processed signals 158, which are then buffered in data buffers 124 in memory system 122. A processed signal 158 is stored in a different data buffer 124 than the input signal 110 from which the processed signal is derived. The signal processors 126 are illustrated in a dotted box and the coupling between the memory system 122 and the signal processor extends to the dotted box to indicate that any of the signal processors may be dynamically coupled to any of the data buffers 124 to retrieve a buffered signal and to store a processed signal.

A particular input signal 110 may be processed to generate more than one processed signal 158 and each of the resulting processed signals 158 are stored in different data buffers 124 in memory system 122. As a result, the original input signal 110 and any versions of the original input signal 110 that are generated as processed signals 158 are available from memory system 122 as buffered signals 156.

In the present embodiment, the signal processors 126 include video scalers 160, embedded audio extractors, ancillary data extractors, signal content analyzers and data compressors 164. The signal processors 126 may also include data de-compressors, image rotation devices, special effects processors, image invertors, spatial filters, edge enhancement processors, color space converters, audio sweetening processors, digital audio decompressors, and digital audio processors. A signal processor may be used to process two or more input signals (or processed signals) by time-division-multiplexing the signal processor between the data buffers used to buffer the two or more input signal (or processed signals).

Each video input signal 110 will have height and width dimensions, usually defined in pixels. For example, a video image may comprise a series of frames that are 640 pixels wide by 400 pixels high. A video scaler 160 is capable of rescaling a video signal from its original dimensions to different dimensions. In the present embodiment, the input processor 104 includes a plurality or bank of video scalers 160. Each video scaler 160 receives control instructions from the input processor local controller 140 to extract a particular video input signal 110 from the appropriate data buffer 124 and rescale the video input signal to specified dimensions and to store the resulting processed signal 158 in another data buffer 124. A video scaler 160 may be configured to retain or change the aspect ratio of an input data signal or to crop the input data signal in the processed signal and to provide any other function that a conventional scaler is capable of providing. For example, a video scaler may be configured to crop the input data signal to select a portion of it, and then scale the cropped video image to specified dimensions.

A particular video scaler 160 may be instructed to scale a video input signal 110 to more than one set of new dimensions and may generate two or more processed signals 158, each of which is separately buffered in separate data buffers 124. In addition, a particular video scaler 160 may be shared (or multiplexed) between two or more video input signals 110 to generate two or more corresponding processed signals 158, each of which is separately buffered in separate data buffers 124. One video input signal 110 may also be retrieved by two or more video scalers 160 (or other signal processors 126) to produce two or more corresponding processed signals 158, which are similarly buffered in separate data buffers 124.

Data compressors 164 are used to generate a processed signal 158 that is a compressed version of any signal stored in a data buffer 124. For example a video input signal 110 in a DVI format may be compressed into an MPEG-2 format to reduce the amount of data required to transmit the signal. The resulting MPEG-2 format video signal is stored in a data buffer 124 as a processed signal 158. The data compressors 164 may include a plurality of compression elements, which may be hardware or software elements, designed to compress audio, video or data signals into various types of compressed signals. The data compressors may provide a lossy or lossless compression. In each case, the compressed data signal produced by a data compressor 164 is stored as a processed signal 158. A particular embodiment of an input processor 104 may include any number and type of data compressors 164.

The data compressors 164 may include horizontal or vertical line filters that produce a processed video data signal comprising a portion of the video data from a video input data signal. For example, a horizontal line filter may be configured to horizontally compress a 640×400 pixel video signal into a 320×400 pixel video signal by discarding every other pixel in each line of the video signal. A vertical line filter may be configured to compress a 640×400 pixel video signal into a 640×200 pixel video signal by discarding every other line in the video signal. A horizontal/vertical line filter may be configured to compress a 640×400 pixel video signal into a 160×100 pixel video signal by discarding three of every four lines of the video signal and discarding three of every four pixels in each line that is retained.

The input signals 110 will typically be asynchronous with respect to one another (unless they are from a synchronized source). The size and timing of packets in each input signal will depend on the signal standard used to encode the signal. For example, input signal 110a may be formed of uniformly sized packets that are spaced equally apart in time. Input signal 110b may be formed of differently sized packets that do not arrive at equally spaced intervals. As a result of the differences between the input signals 110, data buffers 124 may be allocated with a large or smaller memory space to properly buffer each input signal 110.

In addition, the size and timing of packets in processed signals 158 may also vary depending on the data standard used to encode the processed signals 158. The data buffers 124 used to buffer a processed signal 158 may similarly be dynamically allocated a memory space of a suitable size.

The master controller 102 (FIG. 1) controls the operation of the input processor 104. The master controller 102 assigns a unique global identification code to each signal that is buffered in a data buffer 124. This global identification code is used to identify the signal in both the input processor and the output processor. Each version of a particular input signal 110 that is buffered in a data buffer 124 is assigned a different global identification code. For example, video input signal 110a is first buffered in the form in which it is received. The input signal 110a may be scaled to new dimensions using a video scaler 160 to produce a scaled signal 110aa, which is separately buffered. The input signal 110a may also be scaled to a second set of dimensions to produce a second scaled signal 110ab, which is also separately buffered. The second scaled signal 110ab may then be compressed to produce a scaled and compressed signal 110ac, which is also separately buffered. Each of the different versions 110a, 110aa, 110ab, 110ac may be separately retrieved from its data buffer and may be identified using its unique global identification code.

To further explain the invention and the present embodiment, an example of the use of this embodiment will be described. In the example, the input processor 104 receives three digital video input signals 110a, 110b and 110d and one analog video input signal 110e. Analog video input signal 110e is digitized using a A/D converter 150 to produce a digital signal 110e' corresponding to analog signal 110e. Signals 110a, 110b, 110d and 110e' are buffered in separate data buffers 124.

Figure 3:
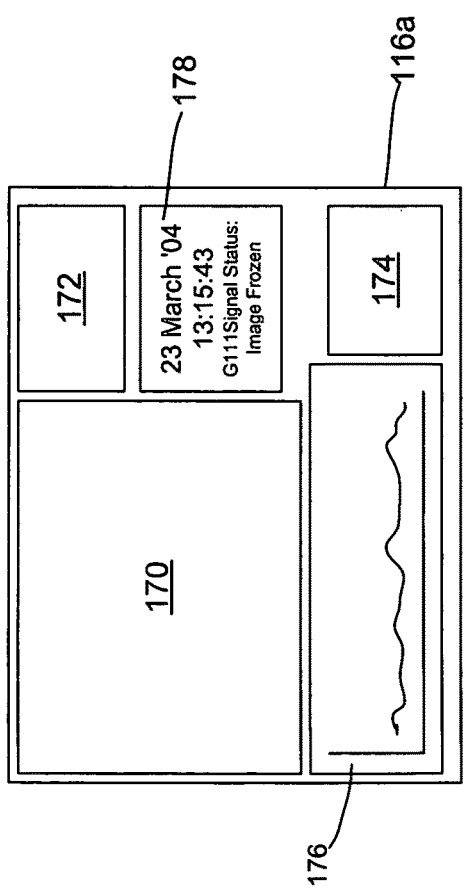
FIG. 3 illustrates the display of a first video monitor.

Reference is made to FIG. 3, which illustrates output device 116a, which is an analog standard definition 4:3 format video monitor capable of displaying images with a resolution of 640×480 pixels. The display of video monitor 116a is used to display information in five different parts or windows: video windows 170, 172, 174 and 176 and graphics window 178.

A user configures the video and other information shown on each video monitor using user controller 118. User controller 118 may provide a graphical or other interface allowing the user to define windows and other elements on a video monitor and assign specific input signals or other information to be displayed in each window or other element. The user has defined the parts of the display on video monitor 116a as follows:

| Window/Element | Position (relative to top left corner) | Dimensions | Contents |
|---|---|---|---|
| Video window 170 | 10, 10 | 400 × 300 | A version of video input signal 110a |
| Video window 172 | 420, 10 | 200 × 113 | A version of video input signal 110b |
| Video window 174 | 460, 340 | 160 × 120 | A version of video input signal 110d |
| Video window 176 | 10, 320 | 440 × 140 | Rejected packets data for video signal 110b |
| Graphics window 178 | 420, 150 | 200 × 150 | Date/Time/Metadata Information |

Figure 4:
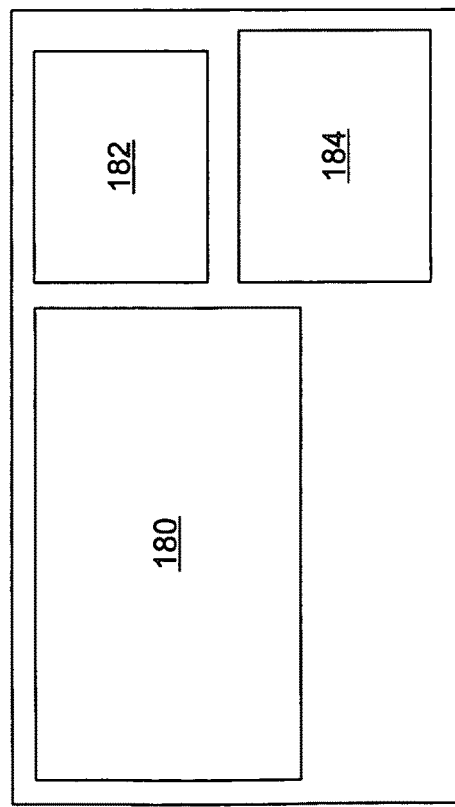
FIG. 4 illustrates the display of a second video monitor.

Reference is made to FIG. 4, which illustrates output device 116b, which is a digital high definition 16:9 format video monitor with a resolution of 1920×1080 pixels. The display of video monitor 116b is used to display information in three different parts or windows: video windows 180, 182 and 184. The user has defined the parts of the display on display monitor 116b as follows:

| Window/Element | Position (relative to top left corner) | Dimensions | Contents |
|---|---|---|---|
| Video window 180 | 60, 60 | 1140 × 640 | A version of video input signal 110b |
| Video window 182 | 1280, 60 | 560 × 420 | A version of video input signal 110e |
| Video window 184 | 1280, 540 | 610 × 460 | A version of video input signal 110a |

In an alternate example, window positions maybe such that some or all of the windows are overlapping, or arranged in a cascaded manner.

The video windows have been described as containing "a version of" one of the video input signals 110. The user will typically specify the position and dimension of a window on a video monitor and the input signal 110 that the user would like displayed in each window. An appropriate version of the input signal is prepared by the input processor 104 and provided to the output processor 106 for display on the video monitor. Alternatively, the user may specify certain signal processing steps to be performed on an input signal before it is displayed in a window. For example, if the signal processors 126 (FIG. 2) include a color/black & white converter, then a user may specify that a color input signal be converted into a black & white signal and that the black & white version of the input signal (or a version of the black & white signal) be displayed in a particular window.

Reference is again made to FIG. 1. The user controller 118 transmits the user's instructions for each output device 116 to the master controller as user control signals 119. The user's instructions relating each output device 116 will typically depend on the nature of the output device 116. For example, if an output device 116 is an audio processing system capable of receiving and switching between multiple audio signals, then the user may specify that one or more audio input signals 110, or the audio components of video input signals 110, be directed to the sound output device 116. If an output device 116 is only capable of receiving a single audio signal and then amplifying and broadcasting the audio signal, the user may specify that a particular input audio signal or the audio component of a particular video input signal 110 be directed to the sound output device 116. Similarly, a user may specify that any particular output device 116 can receive any combination of information that the output device is capable of receiving.

Referring again to FIG. 3, the windows 176 and 178 contain information that is not present in any input signal 110. The user controller is configured to allow the user to select any information that may be generated within system 100 and which is suitable for a particular display device. The rejected packets information displayed in video window 176 may be determined by a signal analyzer (not shown) that analyzes input signal 110b to determine the number of defective packets received as part of the input signal 110b. The signal analyzer is one of the signal processors 126. The signal analyzer then generates a video signal illustrating this information in a standard video signal format and stores the video signal in a data buffer 124 as a processed signal 158.

In response to the user control signals 119, the master controller transmits input processor control signals 120 to the input processor local controller 140 indicating the final version of each input signal 110 that will be required by the output processor 106 to produce the output signals 114 for the output devices 116. For each required version, the master controller 102 also indicates the top left pixel at which that version will be displayed.

For the example input signals 110 and output video monitors 116 described above, the master controller instructs the input processor to prepare the following signals:

i. 400×300 pixel scaled version of video input signal 110a;
ii. 610×460 pixel scaled version of video input signal 110a;
iii. 200×113 pixel scaled version of video input signal 110b;
iv. 1140×640 pixel scaled version of video input signal 110b;
v. 160×120 pixel scaled version of video input signal 110d;
vi. 560×420 pixel scaled version of video input signal 110e; and
vii. 440×140 pixel video image illustrating rejected packet information for video signal 110b.

The master controller 102 does not instruct the input processor to produce a signal showing the date, time and analyzed information, which is required for graphics window 178 on video monitor 116a. This signal is produced in the output processor and is described below.

In response to the input processor control signals 120, the input processor local controller 140 determines how the required versions of each input signal 110 can be produced and configures and couples the input ports 123, A/D converters 150, data buffers 124 and signal processors 126 to produce the required versions of each input signal. As described above, every signal stored in a data buffer 124 is assigned a unique global identification code.

In the present example, the input processor local controller 140 configures the input processor 104 as follows:

i. Store input signal 110a in data buffer 124a. Assign global identification code G101 to the stored signal.
ii. Store input signal 110b in data buffer 124b. Assign global identification code G102 to the stored signal.
iii. Store input signal 110d in data buffer 124c. Assign global identification code G103 to the stored signal.
iv. Couple an A/D converter 150 between input port 123e at which input signal 110e is received to produce a digital version 110e' of input signal 110e. Store digital signal 110e' in data buffer 124e. Assign global identification code G104 to the stored signal.
v. Couple video scaler 160a to memory system 122 to retrieve signal G101 and produce a scaled version of 400×300 pixel scaled version of signal G101. The scaled version is stored in data buffer 124f and is assigned global identification code G105.
vi. Couple video scaler 160b to memory system 122 to retrieve signal G101 and produce a 610×460 pixel scaled version of signal G101. The scaled version is stored in data buffer 124g and is assigned global identification code G106.
vii. Couple video scaler 160c to memory system 122 to retrieve signal G102 and produce a 200×113 pixel scaled version of signal G102. The scaled version is stored in a memory buffer 124h and is assigned global identification code G107.
viii. Couple video scaler 160d to memory system 122 to retrieve signal G102 and produce an 1140×640 pixel scaled version of signal G102. The scaled version is stored in data buffer 124i and is assigned global identification code G108.
ix. Couple video scaler 160e to memory system 122 to retrieve signal G103 and produce a 160×120 pixel scaled version of signal G103. The scaled version is stored in data buffer 124j and is assigned global identification code G109.
x. Couple video scaler 160f to memory system 122 to retrieve signal G104 and produce a 560×420 pixel scaled version of signal G104. The scaled version is stored in data buffer 124k and is assigned global identification code G110.
xi. Couple a signal analyzer (one of the signal processors 126, as described above) to the memory system 122 to retrieve and analyze signal G102. The signal analyzer produces a video signal with a standard size of 320×200 pixels and metadata. The output of the signal analyzer is stored in data buffer 124m and is assigned global identification code G111.
xii. Couple a video scaler 160g to memory system 122 to retrieve signal G111 and produce a 440×140 pixel scaled version of signal G111. The scaled version is stored in data buffer 124n and is assigned global identification code G112.

During the operation of input processor 104, successive packets of each signal stored in a data buffer 124 are stored in the data buffer and previously stored packets are read out and then discarded. Some signals, such as input signal 110a are read by more than one device. Input signal 110a, identified by its global identification code G101, is read out by video scalers 160a and 160b. The data buffer 124a in which input signal 110a is buffered is configured to discard each packet in the input signal only after the packet has been read by both of the video scalers.

Signals G105-G110 and G112 are required to produce the output signals 114 for video monitors 116. These signals are combined into packetized signal 112 using packetized signal formatter 128, packetized signal buffer 130 and packetized signal generator 132. The signals that are used to produce a packetized signal 112 are referred to herein as packet source signals for that packetized signal.

Figure 5:
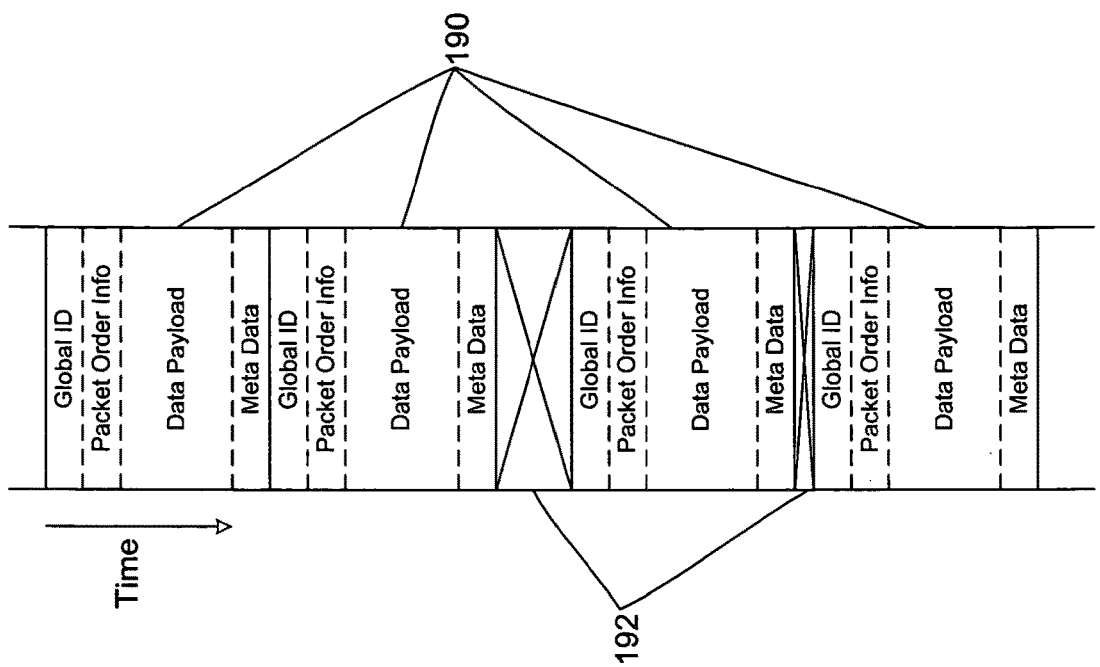
FIG. 5 illustrates one form of a packetized signal according to the present invention.

Reference is next made to FIG. 5, which illustrates the format of the packetized signal 112. In the present embodiment, the packetized signal 112 comprises a series of packets 190, each of which contains the following fields:

i. global identification code for the signal from which the data in the packet was obtained;
ii. packet ordering information;
iii. a data payload;
iv. optional error detection and correction information and other metadata.

The packet ordering information, which may comprise a sequential packet number for each packet with the same global identification code, allows packets derived from the same packet source signal to be isolated from other packets, allowing the data in the packet source signal or a version of the data in the packet source signal to be re-assembled in the output processor 106, as is described below.

In addition to packet ordering information, a video data packet may optionally also include frame ordering information, identifying the particular frame of video signal to which the packet corresponds.

The content and format of the data payload in each packet 190 will depend on the type of the data contained in the packet.

For example, if a packet source signal comprises a stream of data that is not organized as packets of information, then each packet 190 formed from that packet source signal contains a fixed amount of data in the data payload field. For example, if a packet source signal is a continuous stream of video data, then each corresponding packet 190 contains up to 320 bytes of the video data. In other embodiments, the amount of data in a particular packet may be fixed at a different size or may be variable.

If a packet source signal is organized as a series of packets of information, as in case of MPEG-2 encoded video or MP3 encoded audio or AES encoded audio, then the data payload may comprise the entire packet from the packet source signal.

Referring to FIG. 3, video window 170 is a 400×300 pixel window in which signal G105 will be displayed. Signal G105 is created by video scaler 160a in a digital video standard that comprises a stream of video data that is not separated into packets. If each pixel in the 400×300 pixel window 170 requires one byte of video data from signal G105, then an entire frame of video information for the window requires 120,000 bytes of data. If the standard according to which the signal is encoded provides that one complete horizontal line of information will be encoded in a single packet, then each frame will be encoded in 300 packets in data buffer 124f.

Packet signal formatter 128 retrieves the successive packets in data buffer 124f that encode each frame of video signal G105 and produces a series of packets 190 that correspond to the retrieved packets. In the following discussion, pixel numbers are set out as n, m where n is the number of the pixel in a window in a horizontal line of a window or frame and m is the number of the line in the window or frame. Pixels and lines are numbered starting at 1. The packets 190 corresponding to one frame of the 400×300 pixel window include pixel data for the following ranges of pixels:

| Packet | Pixel range |
|---|---|
| 1 | 1,1-320,1 |
| 2 | 321,1-240,2 (i.e. pixels 321-400 on line 1 and pixels 1-240 on line 2) |
| 3 | 241,2-160,3 |
| 4 | 161,3-80,4 |
| 5 | 81,4-400,4 |
| 6 | 1,5-320,5 |
| . | . |
| . | . |
| . | . |
| 373 | 241,298-160,299 |
| 374 | 161,299-80,300 |
| 375 | 81,300-400,300 |

Similarly, the packetized signal formatter reads the successive packets in data buffer 124h that encode each frame of video signal G107 and produces a series of packets 190. The packets 190 corresponding to one frame of the 200×113 pixel window include pixel data for the following ranges of pixels:

| Packet | Pixel range |
|---|---|
| 1 | 1,1-120,2 |
| 2 | 121,2-40,4 |
| 3 | 41,4-160,5 |
| . | . |
| . | . |
| . | . |
| 70 | 81,111-300,112 |
| 71 | 1,113-200,113 |

The last packet 190 used to packetize each frame of video signal G107 contains data for only 200 pixels. The remaining data space is filled with null characters by the packetized signal formatter 128. Alternatively, the last packet may have a shortened data payload length.

The packetized signal formatter 128 produces packets 190 corresponding to the data in the packet source signals. Depending on the data formats used for the packet source signals, the packetized signal formatter 128 may produce one or more packets 190 that correspond to the data in one packet of a packet source signal. For example, if packet source signal G105 is encoded using a digital video standard that includes a complete frame of video in a single packet, then the packetized signal formatter 128 will produce 375 packets 190 corresponding to each packet in the packet source signal.

A single packet 190 may correspond to data from more than one packet of a packet source signal. For example, if packet source signal G107 is encoded using a digital video standard that encodes a single line of a frame in each packet, then the packetized signal formatter will generate packets 190 corresponding to more than one packet in the packet source signal, since each of the packets 190 can contain data for 320 pixels and since each line in packet source signal G107 is only 200 pixels wide.

The packetized signal formatter 128 proceeds to generate packets 190 for each of the packet source signals for the packetized signal 112, as packets from the packet source signals are available from the corresponding data buffers 124. As packetized signal formatter 128 produces packets 190, it stores them in packetized signal buffer 130. Packetized signal buffer 130 is a data buffer and may include memory space in memory system 122.

Packetized signal generator 132 retrieves the packets 190 stored in packetized signal buffer 130 and generates packetized signal 112 at packetized signal output port 138. Packetized signal 112 may be a synchronous signal. For example, in the present embodiment, the packetized signal is a synchronous signal transmitted at 2.5 Gbits/second. Referring to FIG. 5, if there are no packets 190 in the packetized signal buffer 130, the packetized signal generator transmits null characters 192 between packets. In other embodiments, the packetized signal generator may transmit the packetized signal 112 at any bit rate, depending on requirements and capabilities of the system 100.

Reference is made to FIG. 1. In the present embodiment, the packetized signal output port 138 will typically be coupled to the output processor (FIG. 1) through a communication link 186, which may be a data cable such as an electrical or optical cable. The data rate and other aspects of the data protocol used to transmit the packetized signal 112 correspond to the ability of the communication link 186.

In other alternative embodiments, the packetized signal generator 132 may transmit the buffered packets 190 as an asynchronous stream of packets to the output processor using any communication protocol, including TCP/IP. In this case, the communication link 186 may be a cable or may be a LAN, WAN, the Internet or another communication system.

Figure 6:
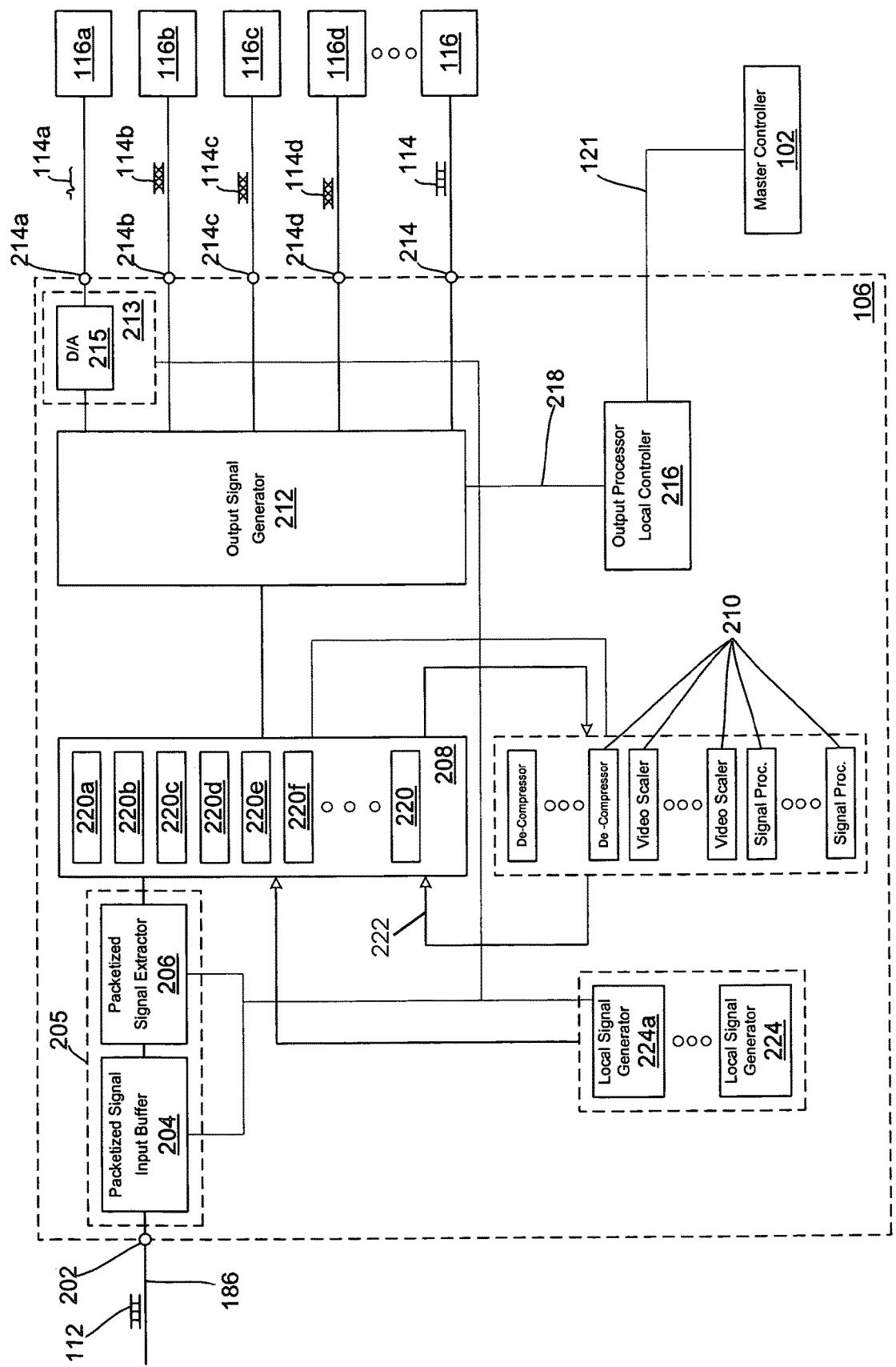
FIG. 6 illustrates a first output processor according to the present invention.

Reference is next made to FIG. 6, which illustrates the output processor 106. The output processor 106 has a packetized signal input port 202, a packetized signal input stage 205, a memory system 208, a plurality of signal processor 210, an output signal generator 212, a bank 213 of digital-to-analog (D/A) converters 215, a plurality of output ports 214 and one or more local signal generators 224. Each packetized signal input stage 205 comprises a packetized signal input buffer 204, a packetized signal extractor 206. The display devices 116 are coupled to the output ports 214.

The output processor 106 also includes an output processor local controller 216 that receives output processor control signals 121 from the master controller 102 (FIG. 1). The output processor local controller 216 is coupled to the various components of the output controller 106 through control lines 218 and controls the operation of those components in response to the output processor control signals 121.

Memory system 208 includes a plurality of data buffers 220.

The output processor control signals 121 received by the output processor local controller 216 indicate:
i. which signals (by their global identification codes) are required for each output signal 114; and
ii. the format of each output signal 114 and, if the output signal is a video signal, the layout of the display including the position and dimensions of each window on the display, in accordance with the user control signals (FIG. 1).

In the present embodiment, the output processor local controller 216 translates each global identification code into a local identification code.

The packetized signal 112 is received at input port 202 and is buffered in packetized stream input buffer 204. As complete packets 190 are stored in buffer 204, they are retrieved by packetized signal extractor 206. The packetized signal extractor 206 determines the global identification code of each packet, translates the global identification code into the corresponding local identification code assigned by output processor local controller and stores packets 190 corresponding to each local identification code in a different data buffer 220. Through this process, the data from each source signal for the packetized signal is isolated in a different data buffer 220. Each isolated signal corresponds to one of the packet source signals for the packetized signal. The packet ordering information from each packet 190 is used to organize the packets 190 into their original sequence. Each isolated signal is referred to herein as an output source signal.

The local identification codes are used within the output processor 106 in place of the global identification code to distinguish between the different local source signals encoded in the packetized signal. In alternative embodiments, the global identification code may be used to identify the different local source signals within the output processor 106.

The signal processors 210 may be used to reverse any compression or other signal processing operation applied in the input processor 104 (FIG. 2) using the signal processors 126. Depending on the signal processing operations performed in the input processor 104, a reversing step may or may not be required. For example, if one of the input signals 110 was compressed using a standard compression format that may be directly used to produce an output signal 114, then it is not necessary to reverse the compression. However, if the result of the compression step produced data that cannot be directly used to produce an output signal 114, then a decompressor may be used to reverse the compression step. For example, one of the signal processor described above was a horizontal line filter, which compresses an input video signal 110 by discarding a portion of the video signal. This compression step may be reversed by interpolating the discarded data from the retained data. The resulting processed signal 222 is stored in a data buffer as an output source signal and is assigned a unique local identification code by the output processor local controller 216.

In addition to reversing signal processing operations applied in the input processor, a signal processor 210 may be used to apply any other signal processing operations to a signal buffered in a data buffer 220 to produce an output source signal.

Reference is made to FIG. 3. Graphics display window 178 on video monitor 116a contains a display of the current date, time and warning messages based on metadata extracted from the input packetized signal received with global identification code G111. The date and time information is generated by a local signal generator 224a, which operates under the control of the output processor local controller. Each local signal generator 224 produces an output source signal containing information and formatted for the use in an output signal. In this example, the local signal generator 224a generates a 200×150 pixel window containing the date and time. The output processor 106 may include other local signal generators 224 that produce other video, audio or data signals for inclusion in the output signals. In each case, the signal produced by the local signal generator is stored in a separate data buffer 220 and is assigned a local identification code. The metadata maybe generated using a signal analyzer among the signal processors 210. The metadata produced by the signal analyzer is combined with the data and time information by a video signal generator in the output signal generator 212. Similar metadata could also be generated in the input processor 104 (FIG. 1) using a signal processor 126.

The output signal generator 212 can generate a variety of digital output signals that may be used directly, or after conversion through a D/A converter 215, by output device 116. The output signal generator 212 may include one or more digital video signal generators, one or more digital audio signal generators or one or more data signal generators or any combination of video, audio and data signal generators. The data signal generators may include TCP/IP signal generators that produce an output signal 114 suitable for transmission using a communications link to a remote computer system, where the output signal may be decoded and used by a video, audio or data system. Similarly, the data signal generator may generate signals in any data format.

The output signal generator 212 extracts the data required for each output signal 114 from the appropriate data buffers 220 and generates the output signal 114. For example, a video output signal generator receives instructions from the output processor local controller 216 identifying the output source signals (by their local identification code and the data buffer 220 in which they are buffered) required for an output signal, the layout of the output video signal in terms of the position and dimensions of each window, and the output source signal for each window. The video output signal generator extracts the video information for each frame from the corresponding data buffers 220 and generates each frame for the output signal 114. If the video signal includes audio components, these audio components are similarly retrieved as output source signals and added to the output video signal 114.

Similarly, the audio and data output signal generators retrieve the output source signals from the appropriate buffers and produce their output signals.

If the device coupled to a particular output port 214 requires an analog output signal, then one of the D/A converters 215 may be dynamically coupled between the output signal generator and the output port 214 to convert the digital output signal into a corresponding analog output signal.

To produce the video signals for the example output video monitors 116*a* (FIG. 3) and 116*b* (FIG. 4), the output processor local controller configures the output processor 106 to operate as follows:

i. Packetized signal extractor 206 operates as follows:
   a. Extract signal G105 from the packetized signal 112 stored in packetized stream input buffer 204, assign it local identification code B201 and store it as an output source signal in data buffer 220*a*;
   b. Extract signal G106 from the packetized signal 112 stored in packetized stream input buffer 204, assign it local identification code B202 and store it as an output source signal in data buffer 220*b*;
   c. Extract signal G107 from the packetized signal 112 stored in packetized stream input buffer 204, assign it local identification code B203 and store it as an output source signal in data buffer 220*c*;
   d. Extract signal G108 from the packetized signal 112 stored in packetized stream input buffer 204, assign it local identification code B204 and store it as an output source signal in data buffer 220*d*;
   e. Extract signal G109 from the packetized signal 112 stored in packetized stream input buffer 204, assign it local identification code B205 and store it as an output source signal in data buffer 220*e*;
   f. Extract signal G110 from the packetized signal 112 stored in packetized stream input buffer 204, assign it local identification code B206 and store it as an output source signal in data buffer 220*f*; and
   g. Extract signal G112 from the packetized signal 112 stored in packetized stream input buffer 204, assign it local identification code B207 and store it as an output source signal in data buffer 220*g*.

ii. Local signal generator 224 produces a 200×150 pixel data and time window as described above. Assign local identification code B208 to this signal and store it as an output source signal in data buffer 220*h*.

iii. Output signal generator 212 generates two output signals as follows:
   a. One output video signal generator 212*a* extracts local signals B201, B203, B205, B207 and B208 from the corresponding data buffers 220 and produces an output signal 114*a*.
   b. A second output video signal generator 212*b* extracts local signals B202 B204 and B206 from the corresponding data buffers 220 and produces an output signal 114*b*.

iv. A D/A converter is coupled between video signal generator 212*a* and output terminal to convert output signal 114*a* into an analog output signal, which is then displayed by video monitor 116*a*.

v. Output signal 114*b* is coupled directly to output port 214*b*. Video monitor 116*b* receives and displays the digital output signal 114*b*.

Referring to FIG. 1, the input processor 104 receives a plurality of different input signals 110, which are asynchronous with respect to one another to be received at the input processor. The input signals are processed using signal processor 126 to put them into a format that is required for the output signals 114 and resulting processed signal (the packet source signals) are combined into a single packetized signal 112. If an input signal 110 does not require any processing to be used as part of an output signal, the input signal 110 may be a packet source signal. The input processor allows a plurality of asynchronous data signals 110, which may include video, audio and data signals, to be combined into a single packetized signal that may be transmitted using a single communication link 186.

The output processor 106 receives the packetized signal 112 and isolates the different packet source signals and stores them in buffers 220 as output source signals. Local signal processor 210 in the output processor 106 may be used to reverse any signal processing operation performed in the input processor, if necessary or desired, to produce the output source signals. In addition, local signal generators 224 in the output processor 106 may be used to produce additional output source signals. One or more of the output source signals is used by a set of output signal generators 212 produce output signals 214. If necessary, a D/A converter may dynamically be coupled between an output signal generator and an output port to convert the corresponding output signal into an analog form.

Together, the input processor 104 and output processor 106 allow a plurality of input signals to be transported from the input ports 108, combined in a manner controlled by a user through the user controller 118 and then provided in the final combined manner to the output devices 116. The input processor 104 and output processor 106 are coupled together using a single communication link 186, eliminating the need to couple each of the input signals separately to the output processor 106.

In the embodiment of FIGS. 1 to 6, the input processor 104 includes video scalers 160 to scale video input signals 110 from their original dimension to other dimensions required for the output signals 114. In some cases, this may required that the input video signal may be expanded to large dimensions, resulting in a packet source signal that requires a larger portion of the packetized signal bandwidth to transmit than the original input signal 110. To reduce this increased usage of bandwidth, another embodiment of the invention may be configured to ensure that the scalers 160 in the input processor 104 are only used to reduce an input signal 110 to smaller dimensions. Video scalers may be included in the output processor as signal processors 210 to scale any input signal that must be enlarged before it is incorporated into an output signal.

Figure 7:
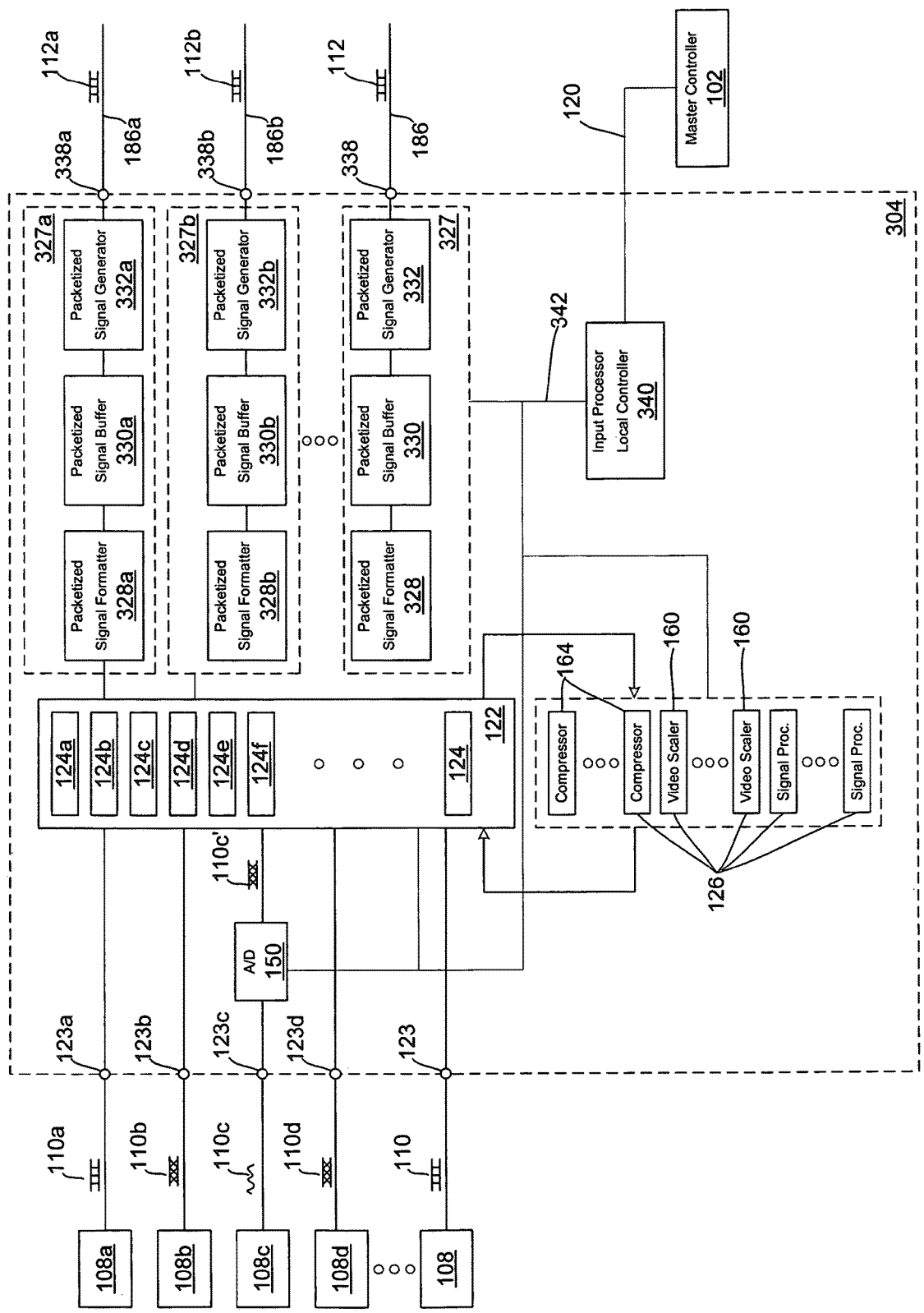
FIG. 7 illustrates a second input processor according to the present invention.

Reference is next made to FIG. 7, which illustrates a second input processor 304. Input processor 304 is similar to input processor 104 (FIG. 2) and similar components are given similar reference numbers. The input processor local controller 340 is coupled to the various components of the input processor 304. These couplings are not illustrated to simplify the Figure. Input processor 304 has a plurality of packetized signal output stages 327, each of which comprises a packetized signal formatter 328, packetized signal buffer 330 and packetized signal generator 332. Each packetized signal output stage 327 is capable of generating a packetized signal 112. Each packetized signal 112 may include information of any one or more of the input signals 110. Input processor 304 may be used to provide packetized signals to different output processors 106 (FIG. 7). Each output processor can receive a packetized signal containing only information from packet source signals that are required to produce the output signals 114 produced by that specific output processor.

The number of packet source signals (which are generally different versions of input signals 110) that can be transmitted in a single packetized signal may be limited by the amount of data in each signal and the bandwidth of the packetized signal. Particularly in the case of audio and video signals, which may be required to be received in real time at the output processor 106 in order to be properly displayed on an output device 116. Input processor 304 allows each input source 108 to be coupled to a single input port on a single input processor and then be combined in different combinations for transmission to different output processors 106. In one embodiment, an input processor includes four output stages to provide four packetized signals 112, which may be coupled to four different output processors 106.

Figure 8:
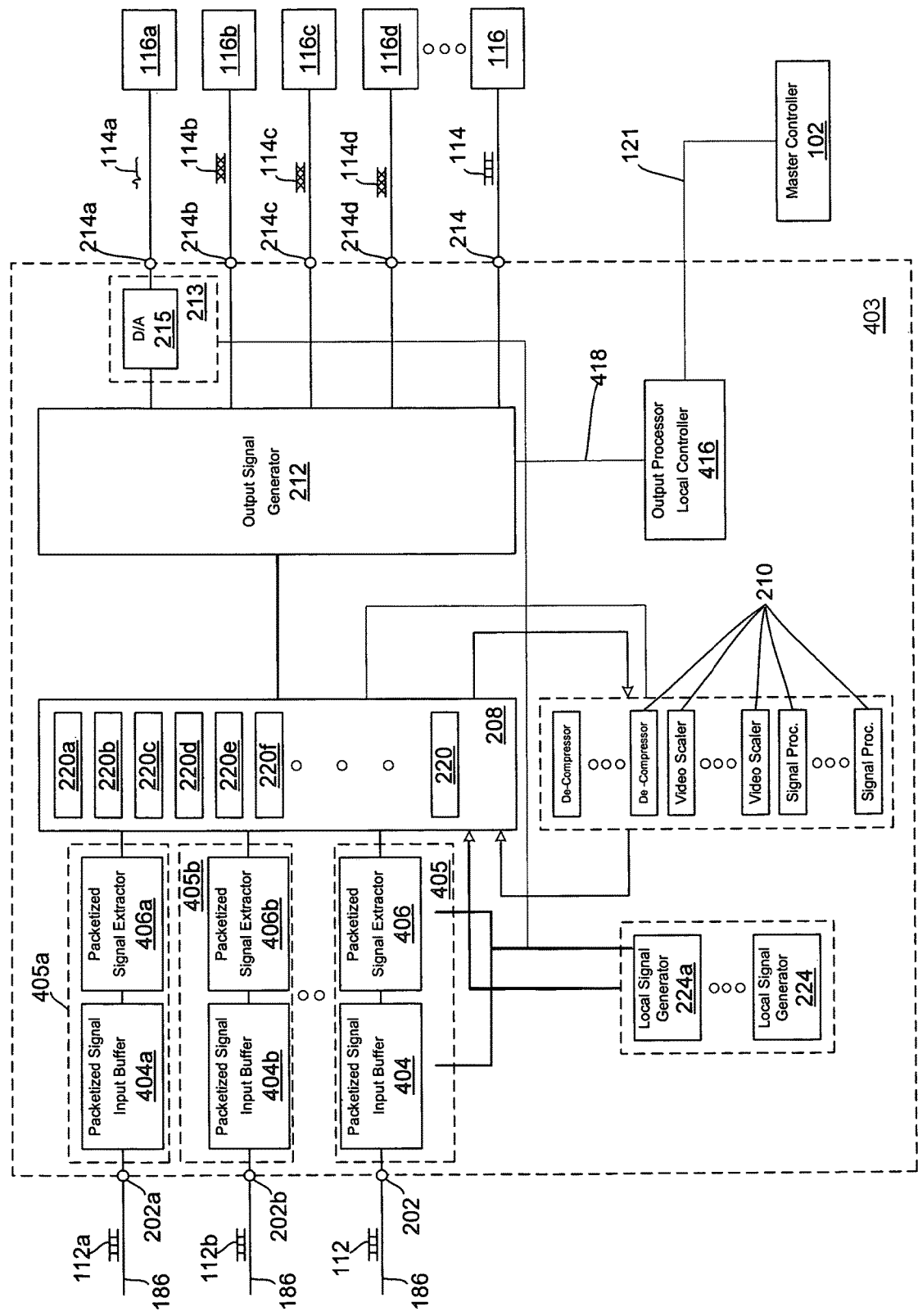
FIG. 8 illustrates a second output processor according to the present invention.

Reference is next made to FIG. 8, which illustrates a second output processor 403. Output processor 403 is similar to output processor 106 (FIG. 6) and similar components are identified with similar reference numbers. Output processor 403 has a plurality of packetized signal input stages 405, each of which comprises a packetized signal input buffer 404 and a packetized signal extractor 406. Each input stage 405 receives a packetized signal 112 at a packetized signal input port 202 and stores the data for each source signal for each packetized signal in a separate data buffer in memory system 208. This allows output processor 403 to receive a larger number of source signal than could be transmitted in a single packetized signal. Output processor 403 operates in the same manner to further process and generate output signals 114, which may incorporate data from one or both of the packetized signals.

Figure 9:
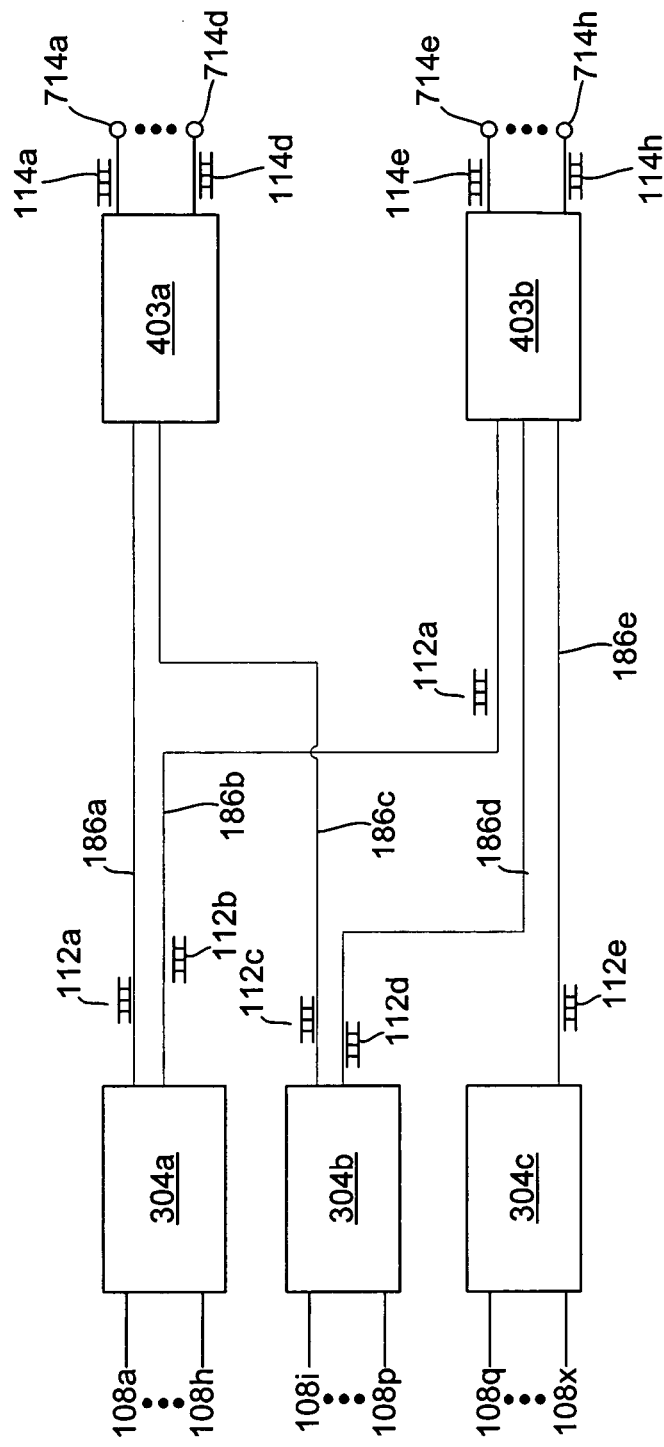
FIG. 9 illustrates an exemplary coupling between a plurality of input processors and a plurality of output processors.

Reference is next made to FIG. 9, which illustrates three input processors 304 and two output processors 403. Input processor 304a receives eight input signals from eight sources 108a-108h and generates two packetized signals 112a and 112b. Input processor 304b receives eight input signals from eight sources 108i-108p and generates two packetized signals 112c and 112d. Input processor 304c receives eight input signals 108q-108x and generates one packetized signal 112e. Output processor 403a receives packetized signals 112a and 112c and produces four output signals 114a-114d at output terminals 714a-714d. These output signals may include information from any of the sixteen input signals 108a-108p. Output processor 403b receives packetized signals 112b, 112d and 112e and produces four output signals 114e-114h at terminals 714d-714h. The output signals 114a-114h may include information from any of the twenty-four input signals 108a-108x. In each case, each input source is coupled to only one input processor, but may be combined with the other input sources in the output signals.

A single packetized signal 112 produced by a input processor 104 or 304 may be coupled to more than one output processor by first routing the packetized signal 112 through a signal replicating device. For example, the packetized signal 112 may be replicated using a cable driver with multiple duplicate outputs or other signal replication device and transmitted on multiple communications links to more than one output processor.

Figure 10:
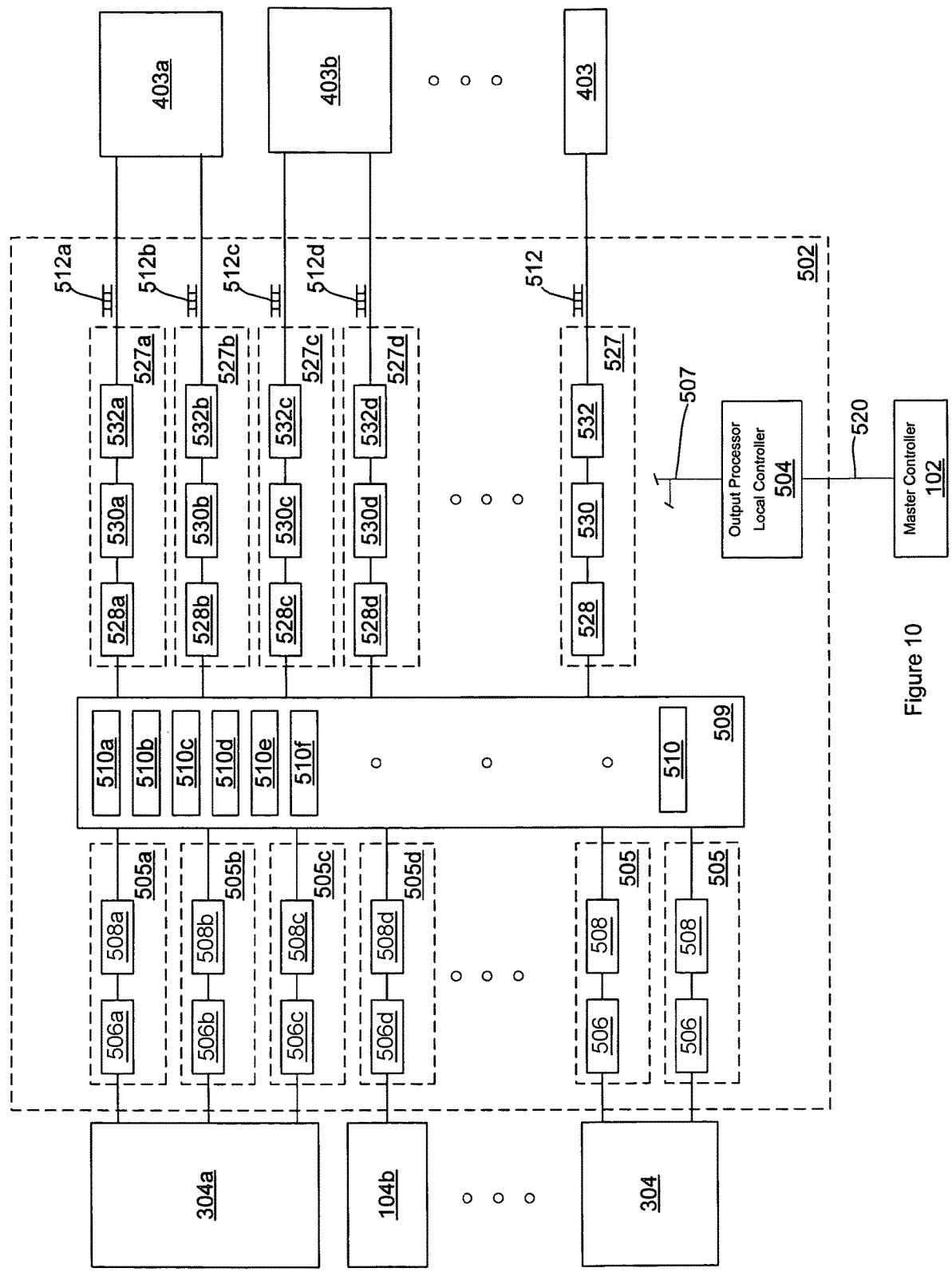
FIG. 10 illustrates a first packet router according to the present invention.

Reference is next made to FIG. 10, which illustrates a first packet router 502 coupled between a plurality of input processors 104 and 304 and a plurality of output processors 403. Each of the input processors produces one or more packetized signals 112 that are received by the packet router 502. Packet router 502 includes a packet router controller 504, a plurality of packetized signal buffers 506, a plurality of packetized signal extractors 508, a plurality of data buffers 510 and a plurality of packetized link output stages. Packet router controller 504 controls the operation of packet router 502 through control lines 507, which couple the packet router controller 504 to the other elements of packet router 502 (connections are not shown to simplify the Figure). Each packetized signal 112 is buffered in a packetized signal buffer 506. As complete packets 190 of a packetized signal 112 arrive, a packetized signal extractor 508 determines the global identification code of each packet 190 and stores all packets 190 corresponding to the same global identification code in a single data buffer 510. The packetized signal extractor operates under the control of the packet router controller, which designates the particular data buffer in which the packets 190 having the same global identification code are stored. Through this process, all packets having the same global identification code are isolated in a data buffer. The actual content of the packets 190 is not altered.

Each packetized signal output stage 527 includes a packet selector 528, a packetized signal buffer 530 and a packetized signal generator 532. The packet selector 528 operates under the control of the packet router controller 504 to extract packets 190 from one or more of the data buffers 510 and place them in packetized signal buffer 530. The packetized router controller receives packet router control instructions 520 from the master controller 102 to generate one or more packetized signals containing corresponding to a set of specified global identification codes. For each requested packetized signal, the packet router controller instructs the packet selector 528 in one of the packetized signal output stages 527 to extract packets from the data buffers 510 corresponding to the specified global identification codes for that requested packetized signal. As the packets become available in the data buffers 510, the packet selector 528 extracts them and stores them in the packetized signal buffer 530. Packetized signal generator 532 operates in the same manner as packetized signal generator 132 to generate a new packetized signal 512.

Each packetized signal output stage 527 operates independently of the others. Any number of packetized signals 512 generated by the packetized signal output stages may include packets from the same data buffer 510 (corresponding to a particular global identification code). Each data buffer is operated to ensure that each packet in the data buffer are not discarded until each packet has been read by every packetized signal output stage that requires the packet.

Through this operation, the packet router receives a plurality of packetized signals 112 and generates a new set of packetized signals 512. The created packetized signals may comprise packets with any combination of global identification codes, allowing input signals received at different input processors to be combined in a single packetized signal 512 for delivery to an output processor 403. Each output processor may receive multiple packetized signals 512 from a packet router 502 and may also receive one or more packetized signals 112 directly from an input processor.

Inserting packet router 502 between a plurality of input processors 104 and 304 and output processors 106 and 403 allows an input signal 110 received at any one of the input processors to be routed (possibly after being processed in the input processor by signal processor 126) to any of the output processors for use by any of the output devices 116 coupled to an output processor. Each input signal is received in only one location, but may be used in multiple formats (by creating appropriate versions of the input signal using signal processor 126) at multiple output devices 116.

Figure 11:
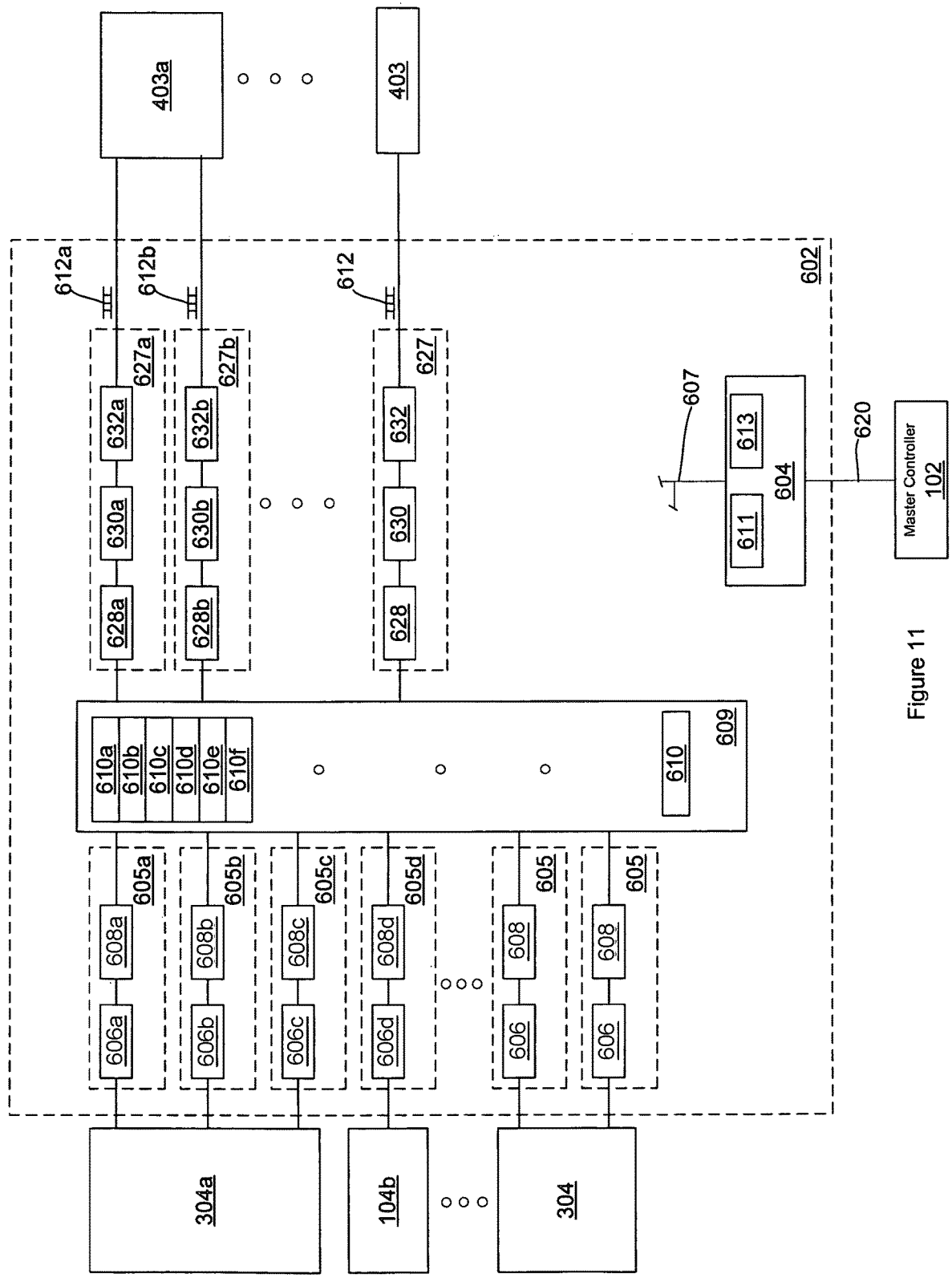
FIG. 11 illustrates a second packet router according to the present invention.

Reference is next made to FIG. 11, which illustrates a second packet router 602. Like packet router 502, packet router 602 receives one or more packetized signals 112 from one or more input processors, and provides one or more packetized signals 612 to one or more output processors. Packet router 602 includes a packet router controller 604, a plurality of packetized signal buffers 606, a plurality of packetized signal extractors 608, a memory system 609 including a plurality of packet storage locations 610 and a plurality of packetized signal output stages 627. Packet router controller 604 controls the operation of packet router 602 through control lines 607. Packet router controller 604 uses the packet storage locations 610 to temporarily store packets 190 from the packetized signal 112.

Each packetized signal 112 is buffered in a packetized signal buffer 606. As each complete packet 190 of a packetized signal 112 arrives, a packetized signal extractor 608 stores the complete packet 190 in one of the packet storage locations 610. The packet router controller 604 maintains a storage location table 611 indicating whether each packet storage location 610 is available to store a newly arrived packet. The packet router controller 604 selects an available packet storage location 610 and instructs the packetized signal extractor to store the newly arrived packet 190 in the selected packet storage location 610. The packet router controller 604 then updates the storage location table 611 to indicate that the packet storage location 610 is not available to store another packet 190.

The packet router controller 604 receives router control instructions 620 (similar to the router control instructions 520 received by packet router controller 502 (FIG. 10)) from master controller 102 instructing the packet router controller to generate the packetized links 612 using packets 190 with specified global identification codes. The packet router controller 604 determines and assigns one of the packetized signal output stages 627 to generate each of the required packetized signals 612 and maintains a global identification code distribution table 613 correlating each global identification code with the packetized signal output stages 627 that require the global identification code. For example, a specified global identification code G603 may be required for three of the outgoing packetized signals 612. The three packetized signal output stage 627 used to generate those three packetized signals 612 are listed in the global identification code distribution table 613 in association with global identification code G603.

Each packetized signal output stage 627 includes a packet selector 628, a packetized signal buffer 630 and a packetized signal generator 632. Packet selector 628 reads packets 190 from the packet storage locations 610 as described below and stores the packets 190 in packetized signal buffer 630. Packetized signal buffer 630 and packetized signal generator 632 operate in the same manner as packetized signal buffer 130 (FIG. 2) and packetized signal generator 132 to produce the packets signals 612.

In the storage location table 611, the router controller 604 maintains the status of each packet storage location 610 by recording the number of packetized link output stages 627 that must read a packet 190 stored in the packet storage location before the packet 190 may be discarded. In the present embodiment, when a newly received packet 190 is stored in a free packet storage location 610, the router controller records the number of packetized signal output stages 627 that require the packet 190 to generate a packetized signal 612. The router controller 604 then instructs each of the packetized signal output stages 627 to read the packet 190 from the packet storage location 610. The packet selector 628 in each packetized signal output stage reads the packet from the packet storage location 610 and indicates to the router controller 604 that it has done so. The router controller 604 than decrements the number of packetized signal output stages 627 that still require the packet in that packet storage location 610. When each of the packetized signal output stages 627 that require the packet 190 have indicated that they have read the packet 190, the packet is no longer required (i.e. the number of packetized signal output stages still requiring the packet 190 is zero), and the router controller 604 treats the packet storage location 610 as free.

For example, each packet 190 with global identification code G603 may be required by packetized signal output stages 627a, 627c and 627d to produce outgoing packetized signal 612a, 612c and 612d. When a complete packet 190 with global identification code G603 is received, router controller 604 selects a free packet storage location 610b and instructs the appropriate packetized signal extractor 608 to store the packet 190 in packet storage location 610b. The router controller 604 then sets the status of packet storage location 610b to "3", indicating that the packet 190 must still be read by three packetized signal output stages. The router controller than instructs packetized signal output stages 627a, 627c and 627d to read the packet 190. Each of packet selectors 628a, 628c and 628d reads the packet 190 and indicates to router controller 604 that it has done so. Router controller 604 decrements the status of the packet storage location 610b as it receives each indication and when the status returns to "0", the packet storage location 610b is again free to store another packet 190.

Figure 12:
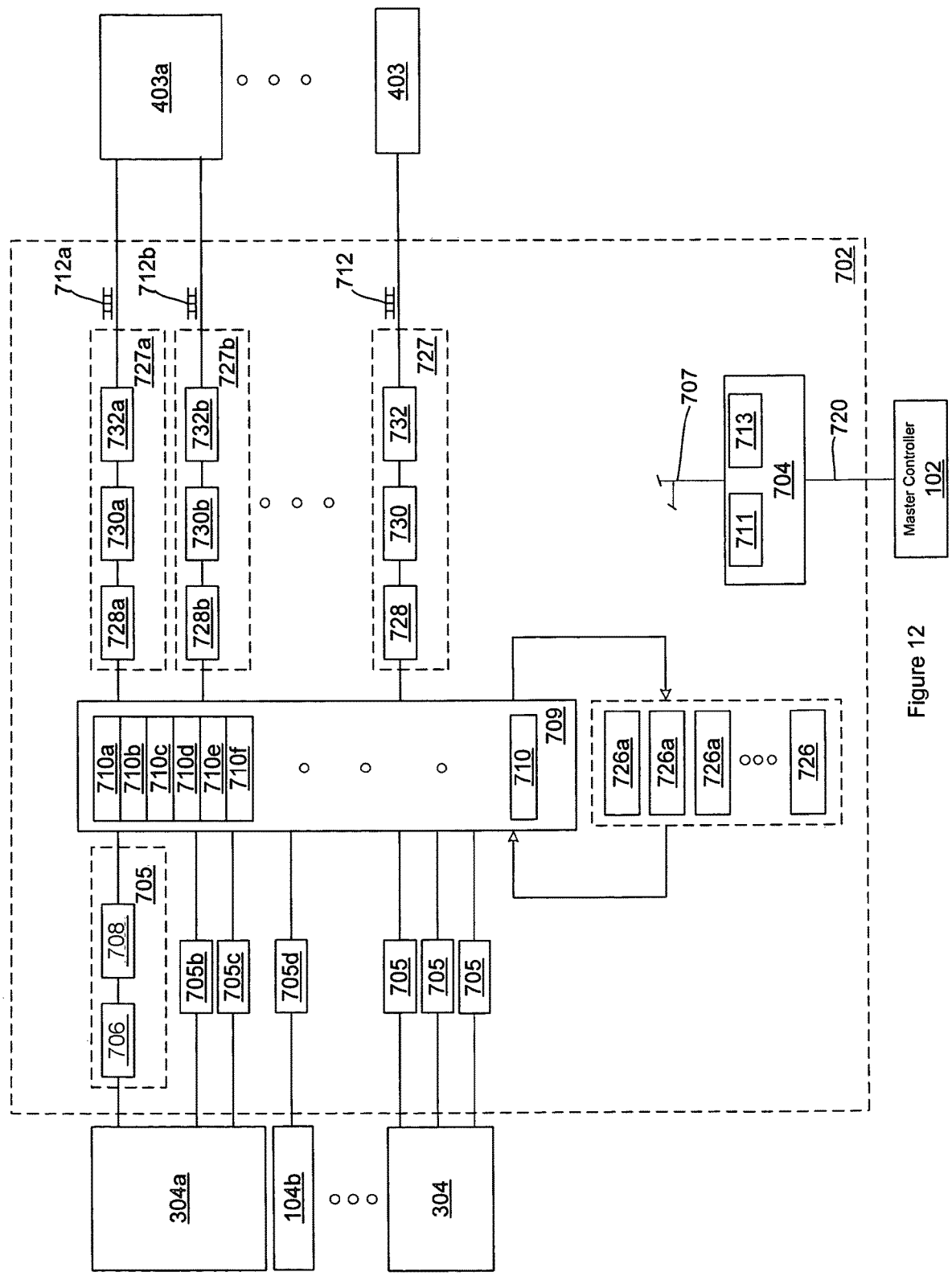
FIG. 12 illustrates a third packet router according to the present invention.

Reference is next made to FIG. 12, which illustrates a third packet router 702. Packet router 702 is similar in structure and operation to packet router 602 and similar components are identified with similar reference numbers, increase by one hundred. Packet router 702 has a plurality of signals processors 726 coupled to memory system 709. Signal processor 726 operate in a similar manner to signal processors 210 (FIG. 6) under the control of router controller 704. Router controller 704 receives instructions from master controller 102 to perform one or more signal processing steps on the signal encoded with a particular global identification code. For example, the master controller may indicate that a video signal with global identification code G734 must be scaled to dimensions of 800×600 pixels and the resulting processed signal is to be assigned global identification code G783 and must be included in packetized signals 712b and 712c. Router controller 704 then configures the global identification code distribution table 713 to route packets with global identification code G734 to a video scaler (not shown) among the signal processors 726. The router controller 704 may also route the same packet to one or more other signal processors 726 or packetized signal output stages 727. The video scaler (not shown) is configured to perform the video scaling operation and produces packets 190 identified with global identification code G783. These packets are stored in free packet storage locations as designated by the router controller 702. The packets are then distributed to packetized signal output stages 727b and 727c using global identification code distribution table 713 and storage location table 711.

Figure 13:
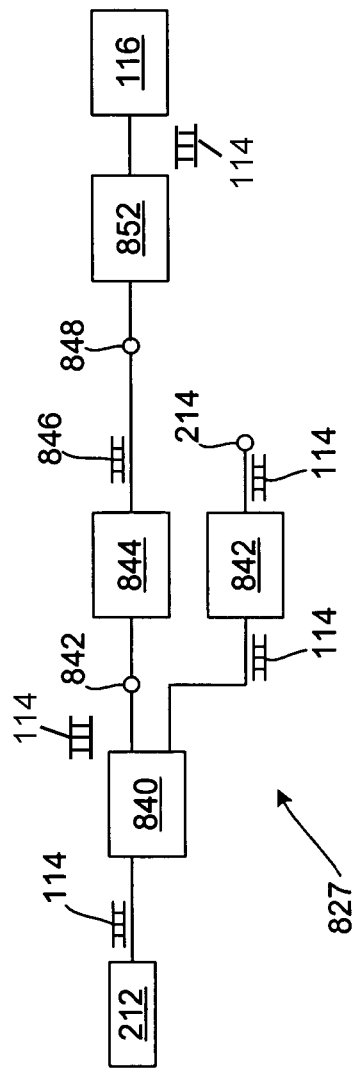
FIG. 13 illustrates an alternative output stage for an output processor according to the present invention.

Reference is next made to FIG. 13, which illustrates an output stage 827 for an output processor. Output stage 827 may be used for video output signals and includes a buffer 840 coupled to output signal generator 212 and an output terminal 214. The output signal 114 generated by the output signal generator 212 is stored in data buffer 840. The stored signal is extracted from the data buffer 840 by a local output generator 842 which makes the output signal 114 available at an output terminal 214. Optionally a D/A converter may be coupled between the local output generator 842 and output terminal 214 to convert the output signal into a corresponding analog output signal for use by an analog device coupled to terminal 214.

The buffered stream is also extracted from the data buffer 840 by a remote output generator 844, which packetizes the video output signal 114 into a graphics packet stream 846.

Each packet in the graphics packet signal 846 contains video data for a fixed number of pixels in the output signal 114. Each packet has the following fields:
  i. packet ordering information, such as video positioning information indicating the first pixel at which the video data is to be displayed; and
  ii. the video data.

Each packet may also contain additional metadata including error correction and detection information, frame numbering information and other information.

The graphics packet signal 846 is transmitted to a graphics packet signal ports 848, from which it may be transmitted across a communication link 850 to display interface 852 capable of receiving the graphics packet signal 846, reconstructing the output signal 114 and displaying the output signal on a display monitor 116.

Output stage 827 allows an output signal 114 to be replicated on two different display monitors. The output signal 114 may be replicated on any number of display monitors by providing a remote output generator for each such monitor.

Figure 14:
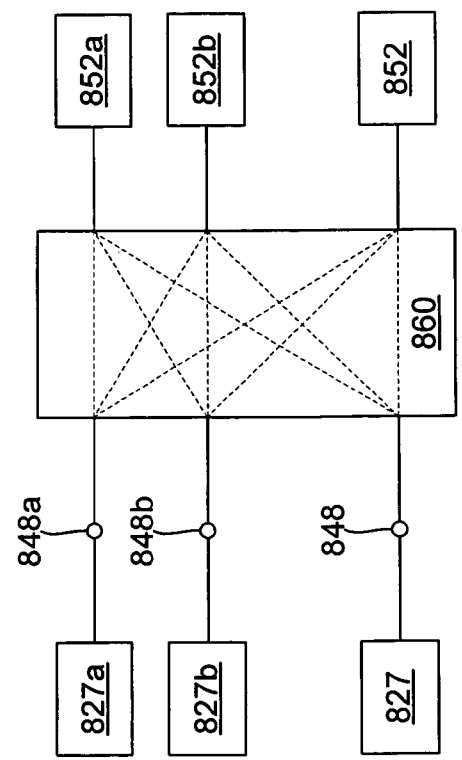
FIG. 14 illustrates a switch for use with the alternate output stage of FIG. 13.

Reference is next made to FIG. 14, which illustrates a switch 860 coupled between a plurality of graphics packet signal ports 848, which may be part of one or more output stage 827 in one or more output processors, and a plurality of display interfaces 852. The switch 860 may be implemented as a physical switch, which may be manually operable or automatically operable under the control of the master controller 102 (not shown in FIG. 12). The switch 860 may be implemented using a field-programmable gate array (FPGA) or with any other switching or packet routing technology. Switch 860 allows any of the graphics packet signal ports 848 to be coupled to any display interface 852, allows any of the output signals 114 available at any of the graphics packet signal ports 848 to be displayed at any display monitor coupled to a display adapter 852.

The present invention has been described here by way of example only. Various modification and variations may be made to these exemplary embodiments without departing from the spirit and scope of the invention, which is limited only by the appended claims.

We claim:

1. A system for producing a plurality of packet source signal packets, the system comprising:
  one or more input ports for receiving one or more input signals;
  one or more input signal processors for processing at least one of the one or more input signals to provide two or more corresponding processed signals;
  an input processor memory system for buffering the two or more corresponding processed signals as buffered signals, wherein each of the buffered signals is assigned a unique global identification code and at least some of the buffered signals are designated as packet source signals;
  one or more output stages for retrieving one or more of the packet source signals from the input processor memory system and for each packet source signal, producing a corresponding one or more packet source signal packets, wherein each of the packet source signal packets of a corresponding packet source signal contains the unique global identification code and data corresponding to the same packet source signal.

2. The system of claim 1, wherein at least one of the one or more input signal processors comprises a video scaler for providing a scaled version of at least one input signal as the two or more corresponding processed signals.

3. The system of claim 1, wherein at least one of the one or more input signal processors comprises a data compression element for providing a compressed version of at least one input signal as the two or more corresponding processed signals.

4. The system of claim 3, wherein the data compression element comprises a horizontal line filter.

5. The system of claim 3, wherein the data compression element comprises a vertical line filter.

6. The system of claim 1, wherein the one or more input signals comprises one or more video signals.

7. The system of claim 1, wherein the one or more input signals comprises one input signal and the two or more corresponding processed signals comprises four processed signals.

8. The system of claim 1 wherein the one or more output stages are further configured to transmit the plurality of packet source signal packets on a network using the unique global identification code.

9. The system of claim 1 further comprising one or more A/D converters coupled between one or more of the input ports and the input processor memory system.

10. A method of producing a plurality of packet source signal packets comprising:
  receiving one or more input signals;
  determining which of the one or more input signals are required to generate the plurality of packet source signal packets;
  processing at least one of the one or more input signals to provide two or more corresponding processed signals, and buffering the two or more corresponding processed signals in a memory system as buffered signals;
  assigning each of the buffered signals a unique global identification code;
  designating one or more of the buffered signals as packet source signals; and
  generating the plurality of packet source signal packets, wherein each packet source signal packet of a corresponding packet source signal contains the unique global identification code and data corresponding to the same packet source signal.

11. The method of claim 10, wherein at least one of the two or more processed signals is a scaled version of the corresponding input signal.

12. The method of claim 10, wherein at least one of the two or more processed signals is a compressed version of the corresponding input signal.

13. The method of claim 10, wherein the one or more input signals comprises one or more video signals.

14. The method of claim 10, wherein the one or more input signals comprises one input signal and the two or more processed signals comprises four processed signals.

15. The method of claim 10, further comprising transmitting the plurality of packet source signal packets on a network using the unique global identification code.

16. A method of producing a plurality of packet source signal packets comprising:
  receiving one or more input signals;
  determining which of the one or more input signals are required to generate the plurality of packet source signal packets;
  processing the one or more input signals required to generate the plurality of packet source signal packets to provide two or more corresponding processed signals, wherein at least two processed signals correspond to the same input signal, and buffering the two or more corresponding processed signals, including the at least two processed signals corresponding to the same input signal, in the memory system as two or more buffered signals;

assigning some of the two or more buffered signals, including the at least two buffered signals corresponding to the same input signal, a corresponding unique global identification code;

generating the plurality of packet source signal packets from each buffered signal assigned the unique global identification code, wherein each packet source signal packet of a corresponding buffered signal contains the unique global identification code and data corresponding to the buffered signal from which it is generated; and transmitting the plurality of packet source signal packets on a network using the unique global identification code.

17. The method of claim 16, wherein at least one of the two or more processed signals is a scaled version of the corresponding input signal.

18. The method of claim 16, wherein at least one of the two or more processed signals is a compressed version of the corresponding input signal.

19. The method of claim 16, wherein the one or more input signals comprises one or more video signals.

20. The method of claim 16, wherein the one or more input signals comprises one input signal and the two or more processed signals comprises four processed signals.

* * * * *